June 22, 1965  R. D. LIVINGSTON  3,190,147
TRANSMISSION MECHANISM
Filed Sept. 1, 1961 15 Sheets-Sheet 1
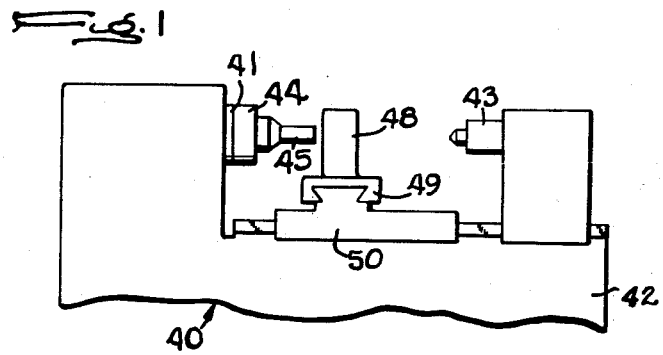
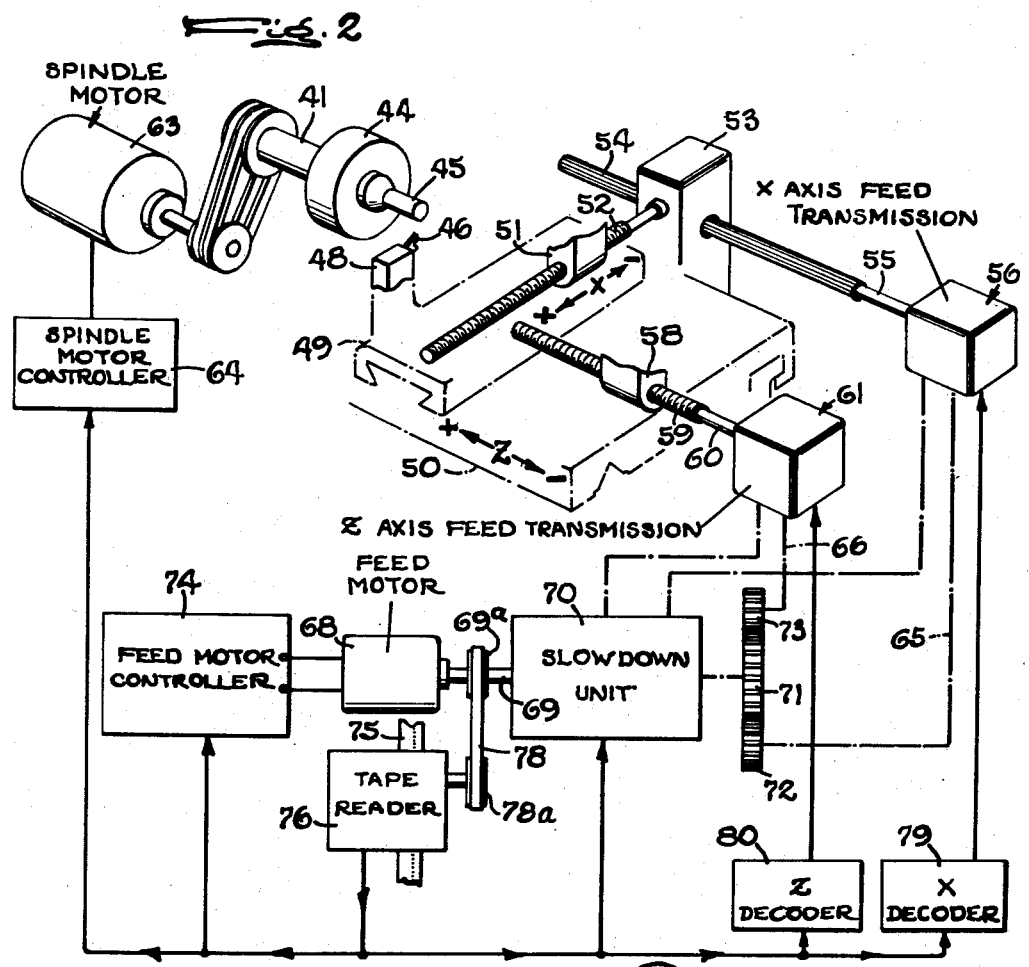
INVENTOR
Richard D. Livingston
by Wolfe, Hubbard, Voit & Osann
ATTORNEY

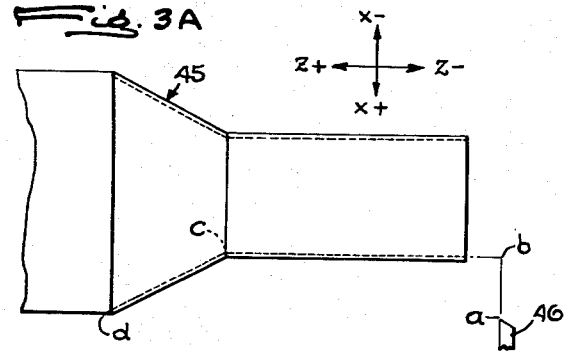
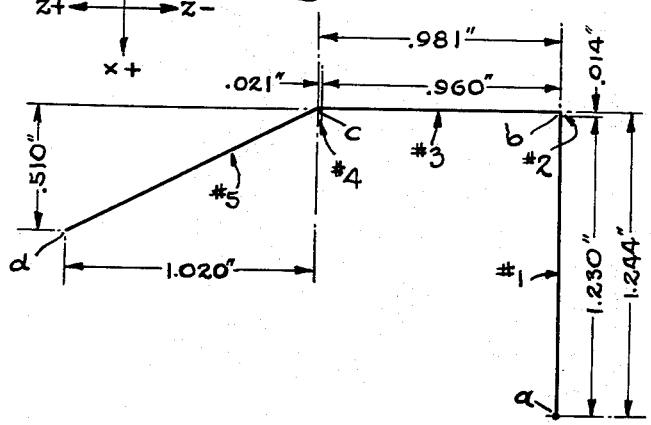
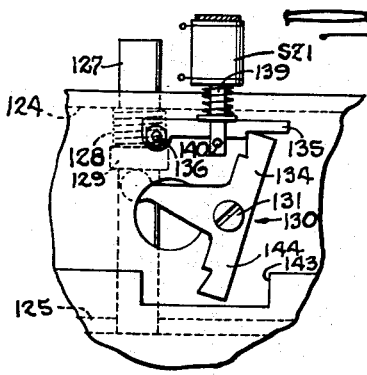

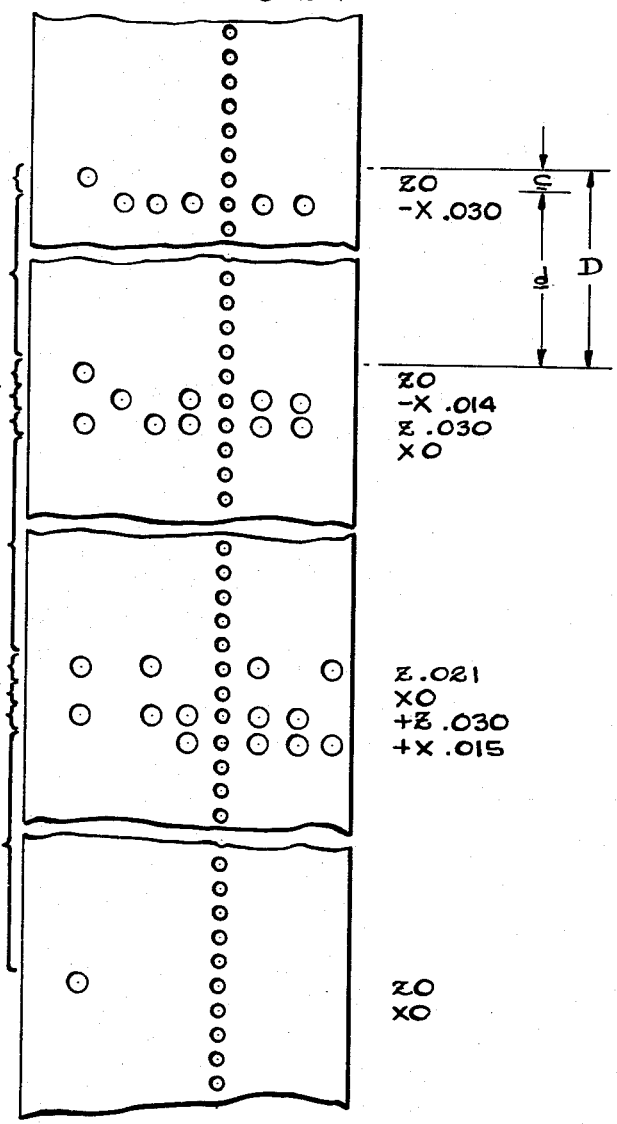

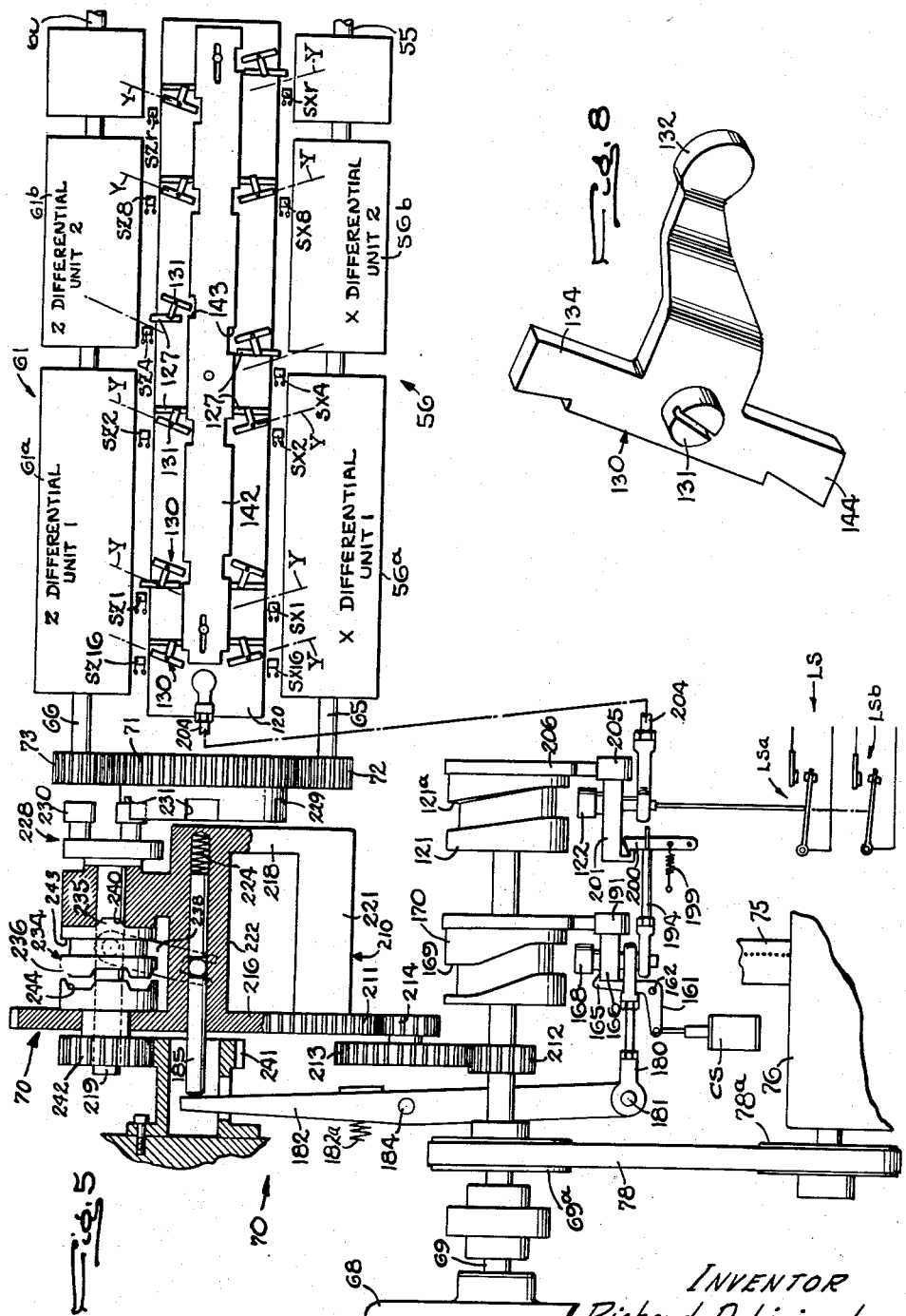

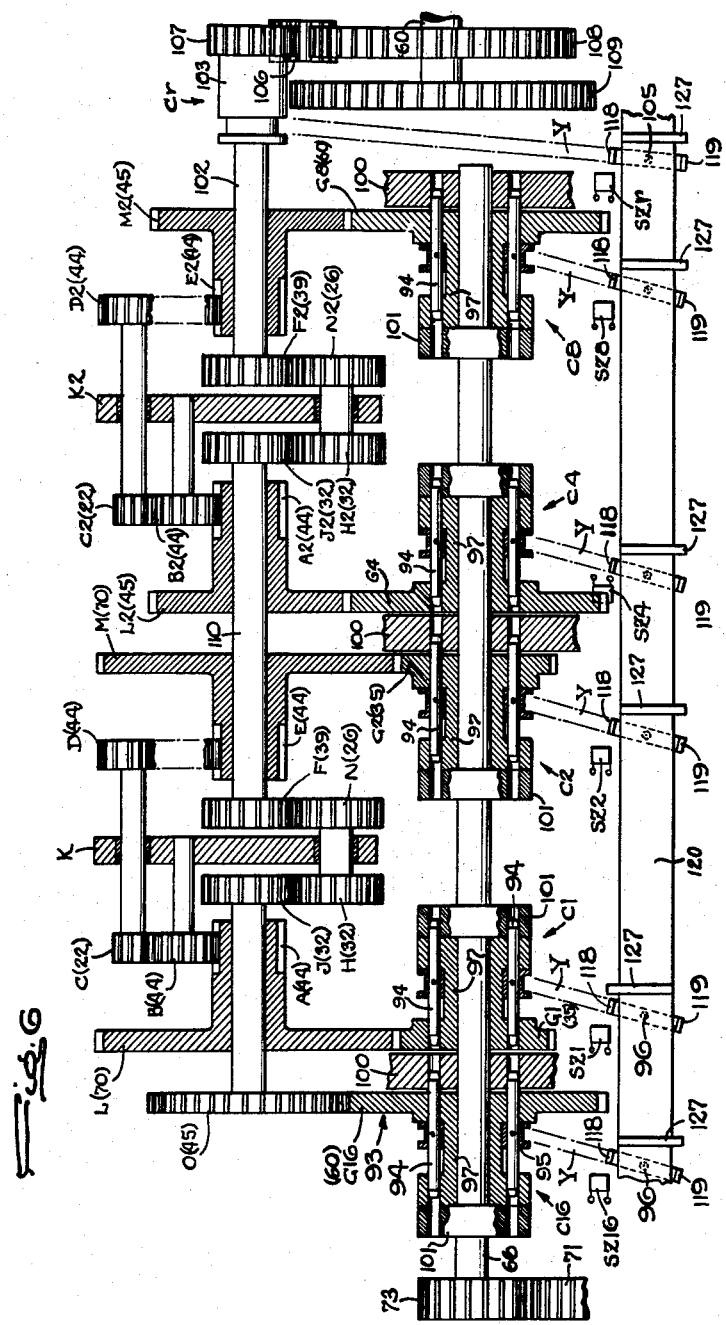

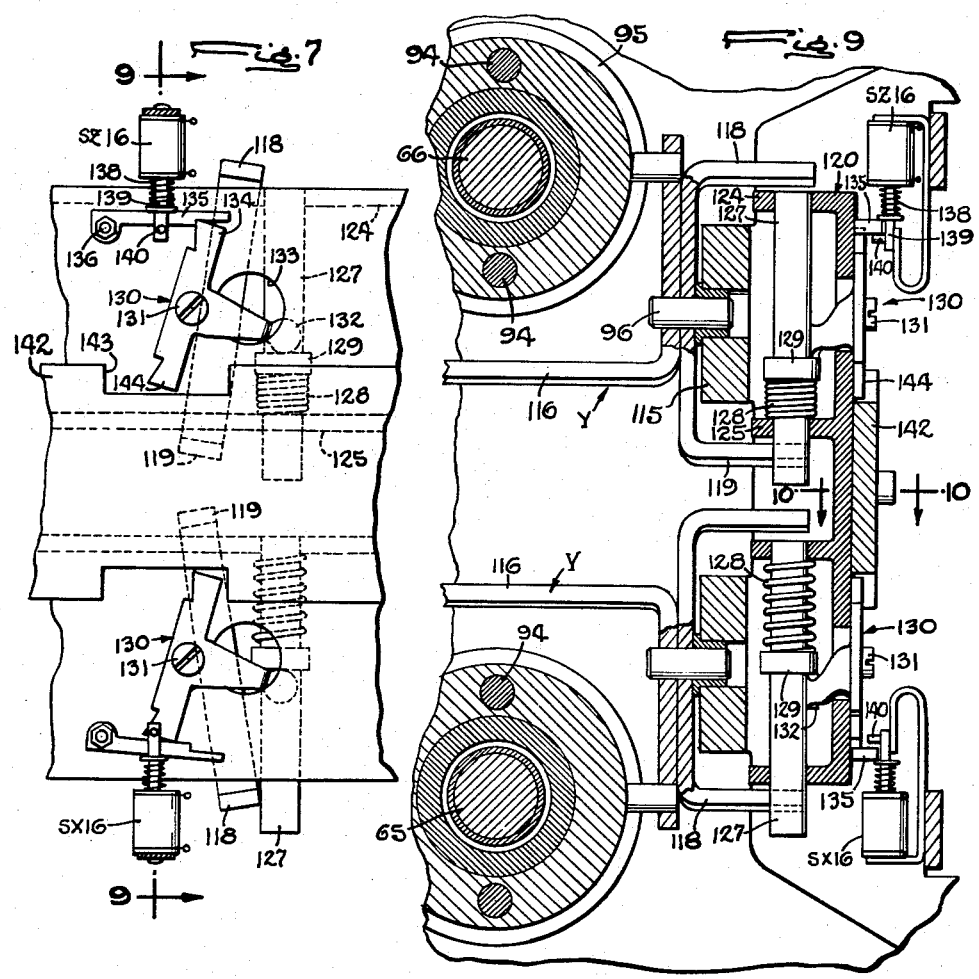

June 22, 1965 R. D. LIVINGSTON 3,190,147
TRANSMISSION MECHANISM
Filed Sept. 1, 1961 15 Sheets-Sheet 7
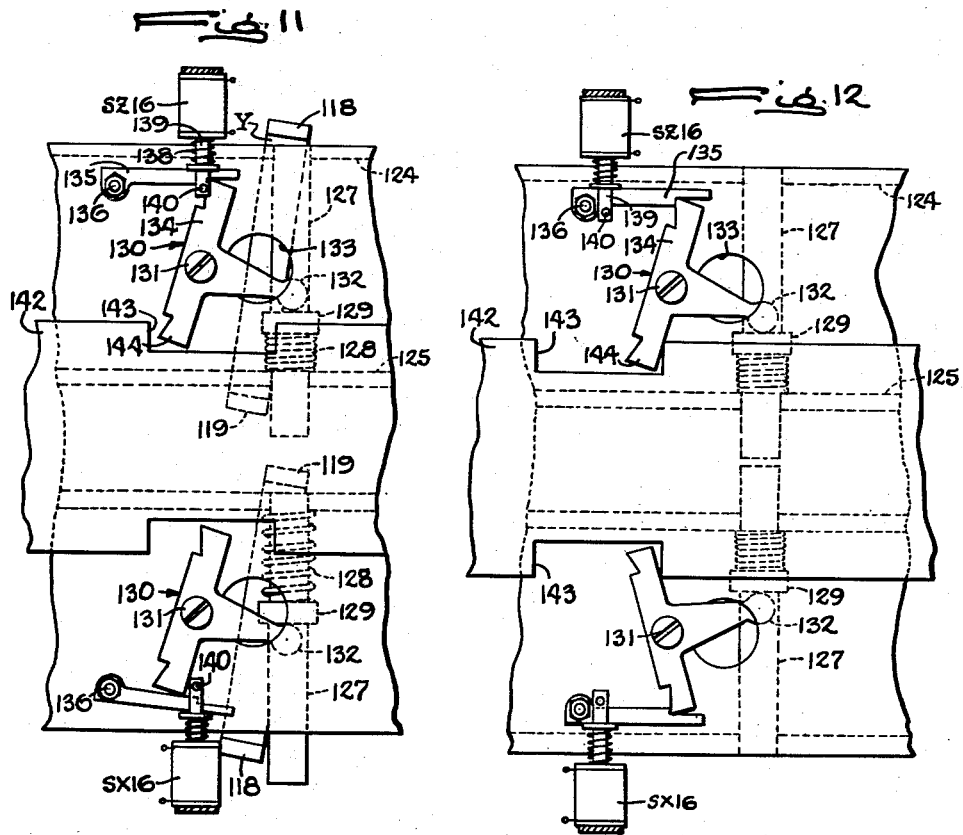
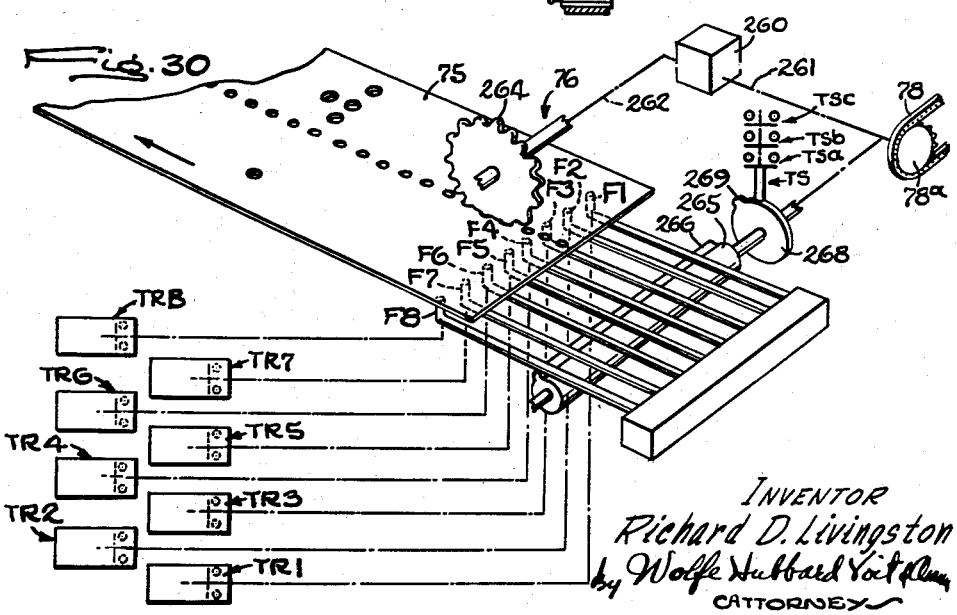

June 22, 1965 R. D. LIVINGSTON 3,190,147
TRANSMISSION MECHANISM
Filed Sept. 1, 1961 15 Sheets-Sheet 8
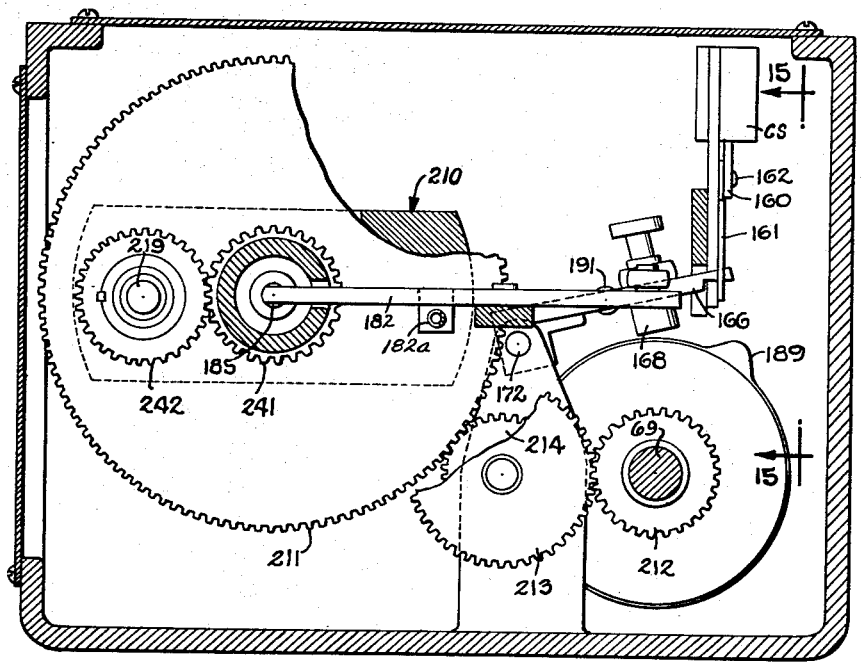
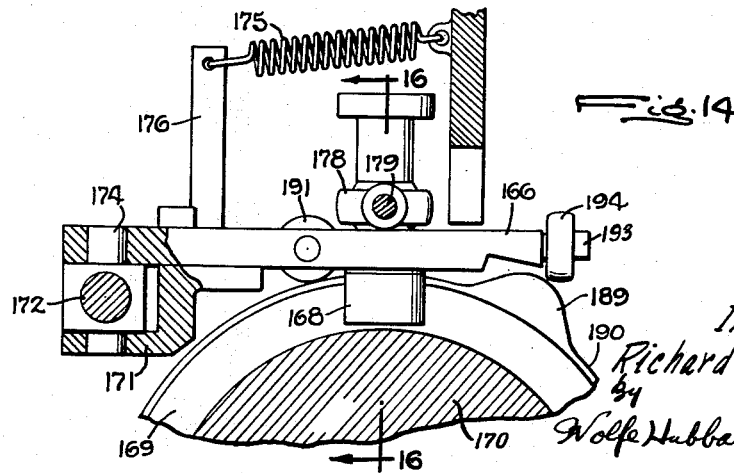
INVENTOR
Richard D. Livingston
by
Wolfe Hubbard Voit & Osann
ATTORNEY

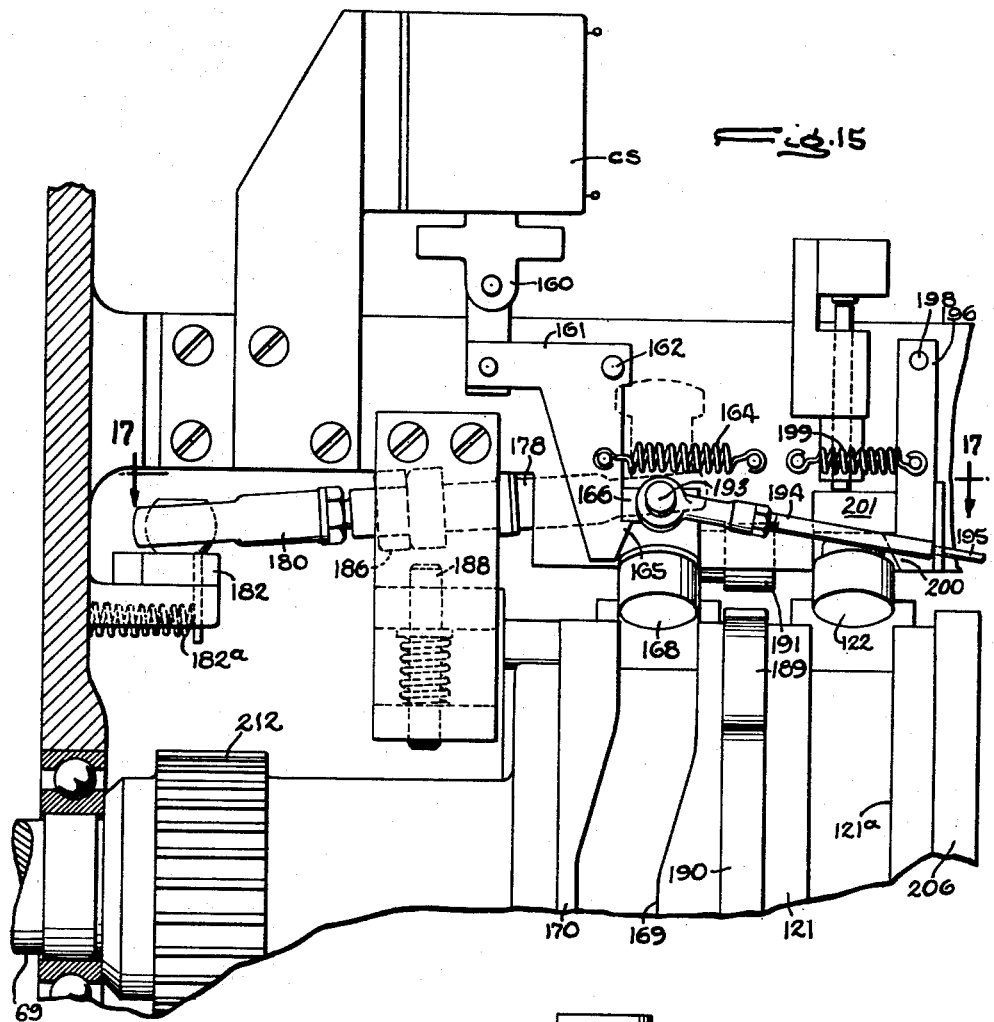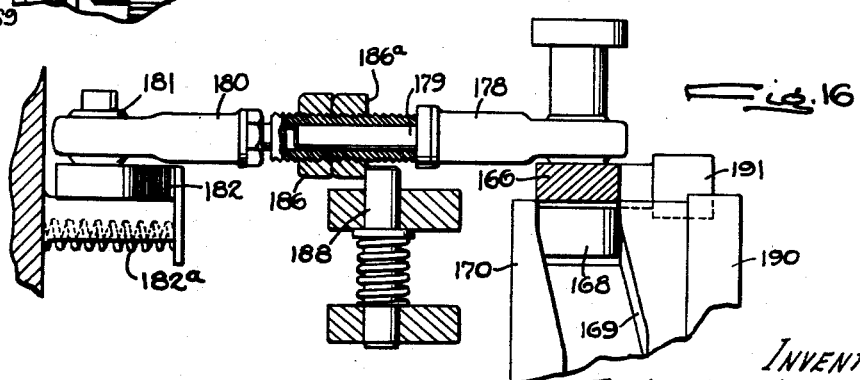

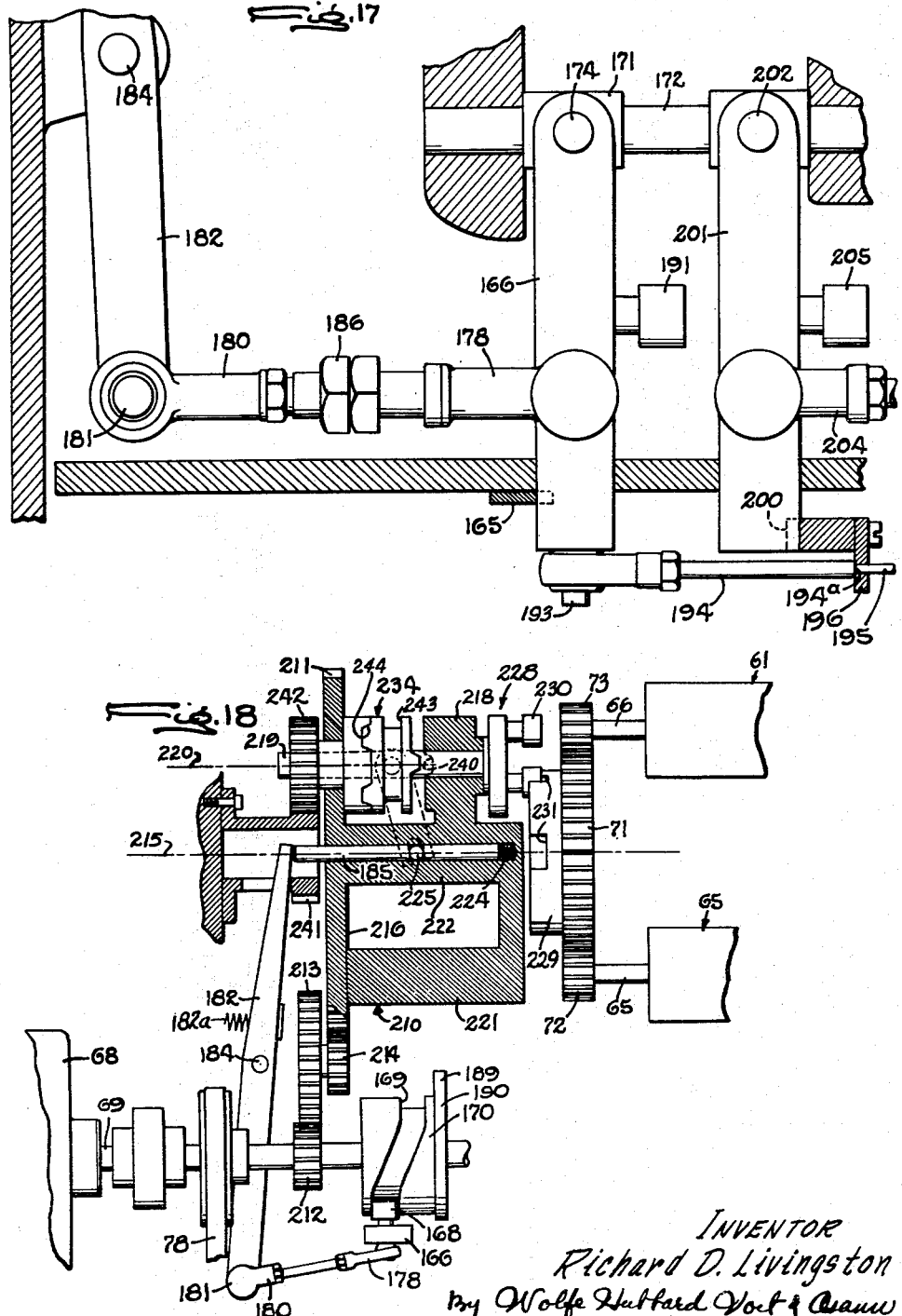

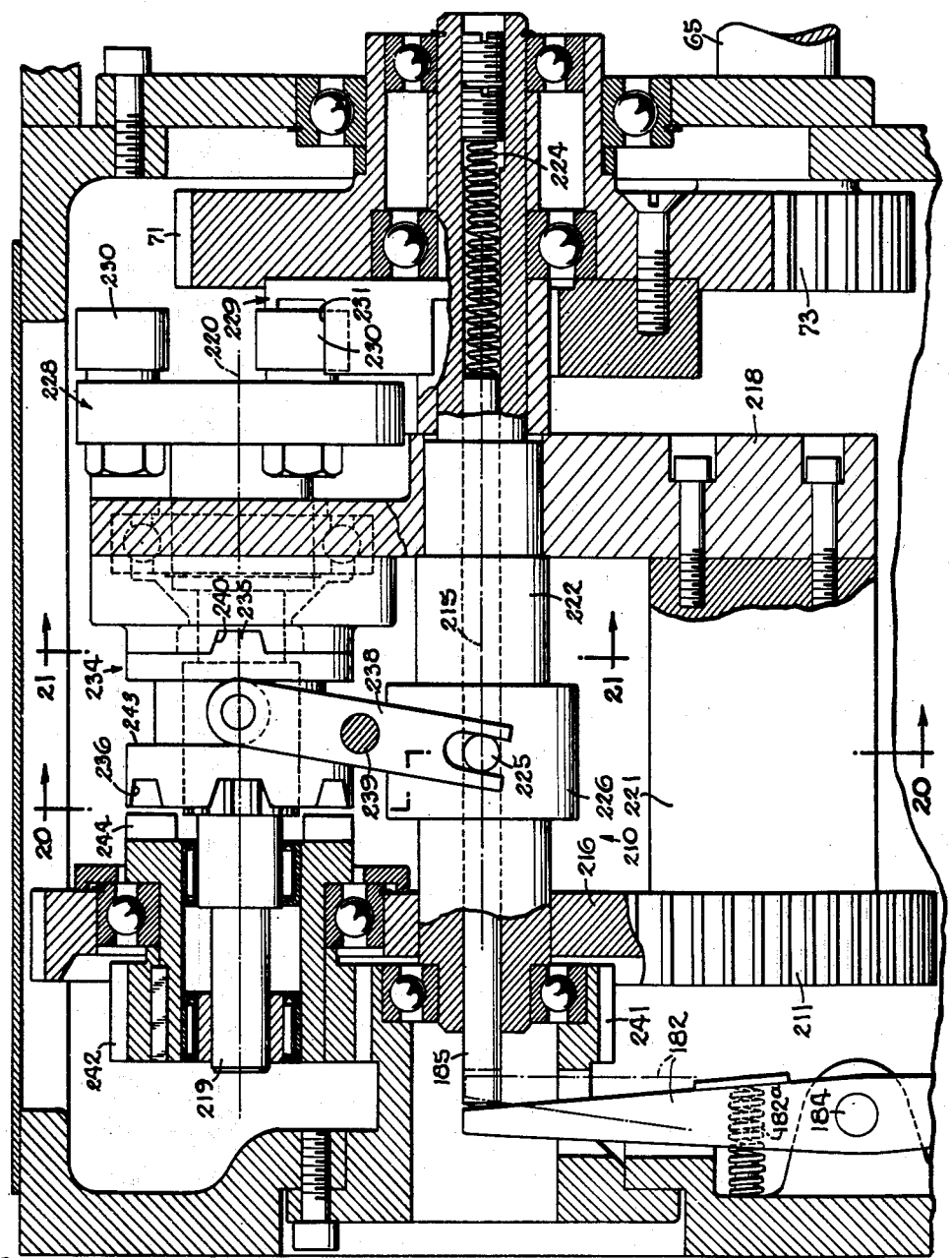

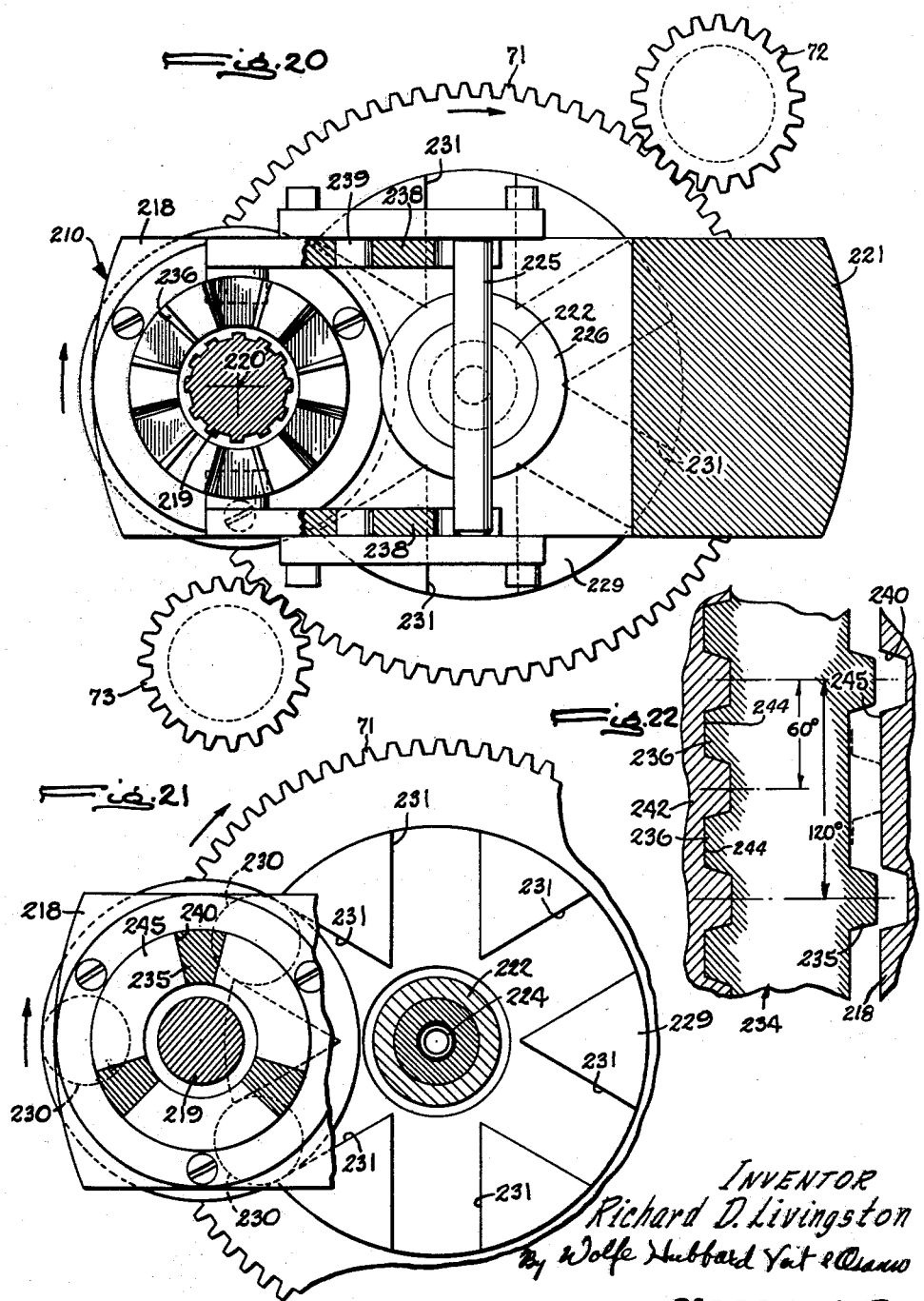

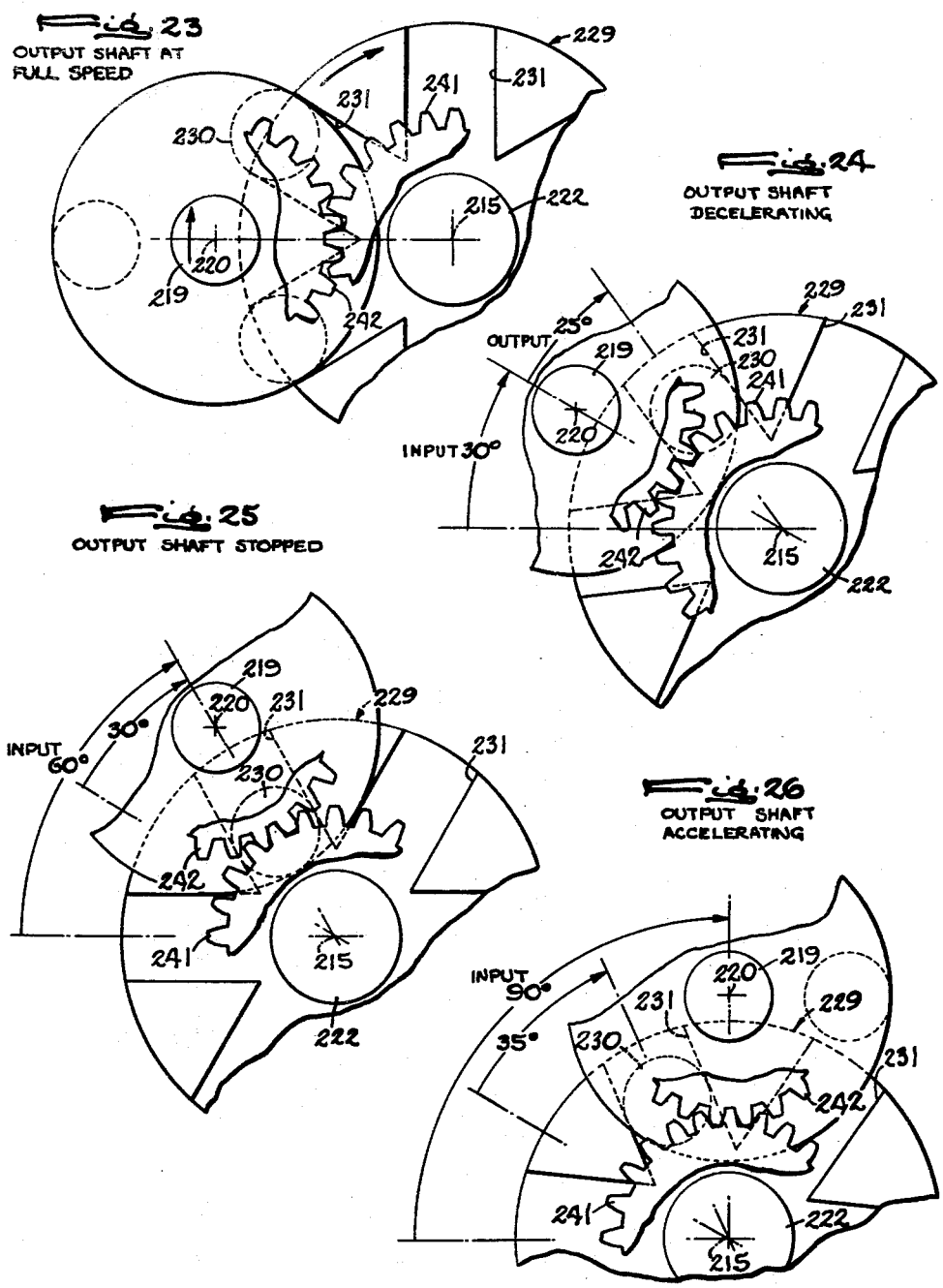

OUTPUT SHAFT AT FULL SPEED

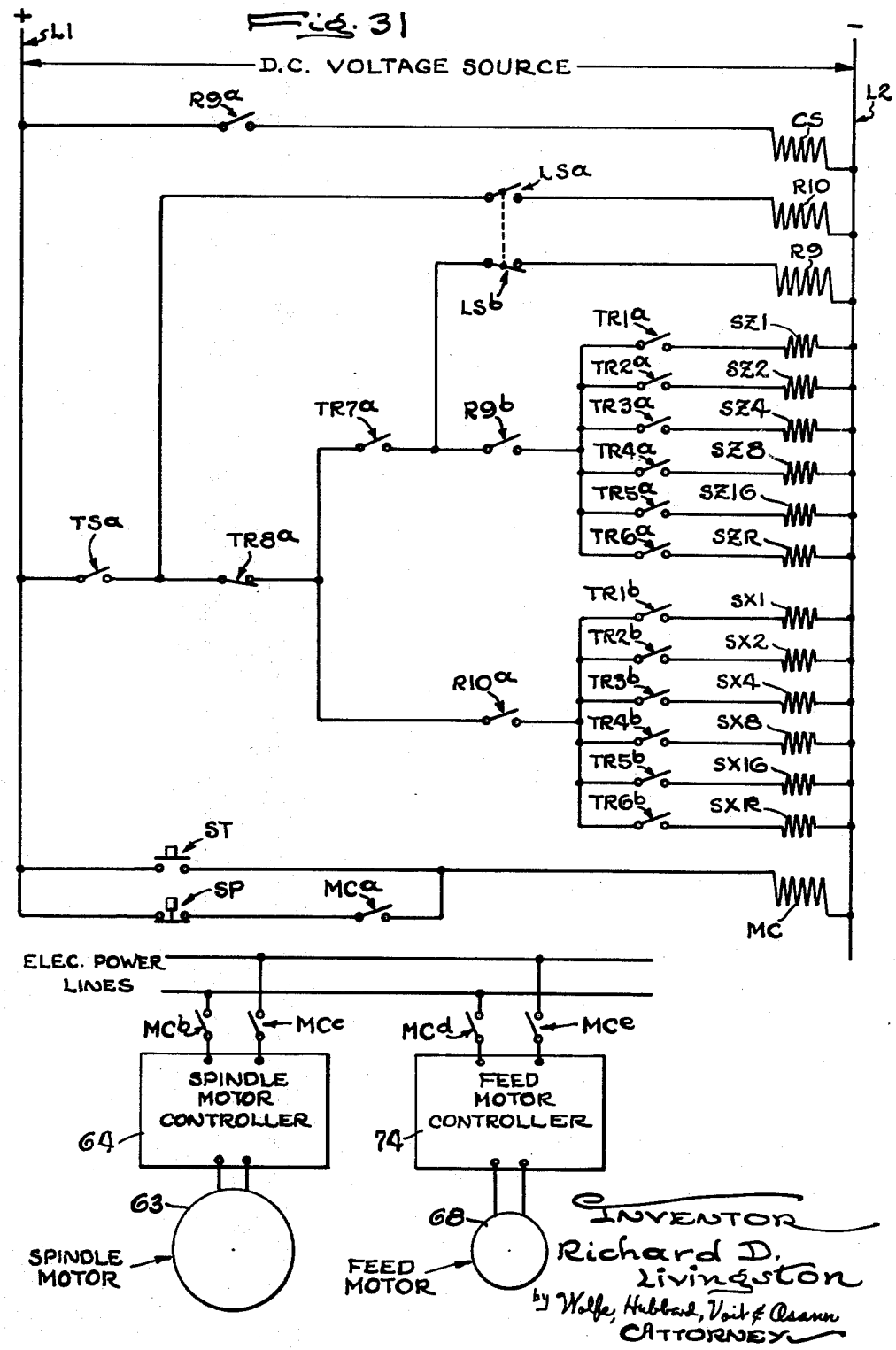

United States Patent Office 3,190,147
Patented June 22, 1965

3,190,147
TRANSMISSION MECHANISM
Richard D. Livingston, Rockford, Ill., assignor to Barber-Colman Company, Rockford, Ill., a corporation of Illinois
Filed Sept. 1, 1961, Ser. No. 135,676
22 Claims. (Cl. 74—751)

The present invention relates in general to motion-transmitting mechanisms and in particular to multi-ratio transmissions and associated components which afford selective shifting or changing of drive ratios while a main power shaft continues to rotate. While the present invention may be employed in a variety of different applications, it finds especially advantageous use in programmed motion control systems of the type disclosed and claimed in the copending application of Eugene S. Swanson et al., Serial No. 135,679, filed of even date. For completeness in setting out the background environment of the invention, it will be described herein by way of example as used in such a programmed motion control system.

It is the general aim of the invention to provide improved motion-transmitting apparatus having input and output shafts and characterized by the ability to change the drive ratio between those shafts to any of a wide range of values while nevertheless always keeping the total extent of output shaft rotation accurately related to the total extent of input shaft rotation.

A related object is to provide such motion-transmitting apparatus in which different drive ratios are produced by engagement and disengagement of positive clutch and brake units, but in which the latter are reliably shifted to different states of engagement while a main power shaft continuously rotates.

It is another object of the invention to provide multi-ratio motion-transmitting apparatus in which a shifting cycle of operation to change the drive ratio always results in a loss of a predetermined angle of rotation of the main input shaft, so that the extent of output rotation is accurately known or metered in terms of the number of revolutions of the input shaft rotation, there being deducted or disregarded a multiple of said predetermined angles, the multiple being equal to the number of shifting cycles which have occurred.

A further object of the invention is to provide a new and improved slowdown mechanism which may be selectively put through cycles of operation, and which operates to decelerate to a low velocity and then accelerate to normal velocity its output shaft while its input shaft continuously rotates at a constant velocity.

Still another object of the invention is to provide such a slowdown unit which in response to an actuating signal always causes its output shaft to reach its lowest velocity when in one of a limited number of angular positions. A related object is to provide such a slowdown unit which is initiated into one cycle of operation by a momentary actuating signal, but which then automatically terminates the acceleration-deceleration cycle after a predetermined amount of rotation of its input shaft.

It is still another object of the present invention to provide a new and improved mechanism for selectively setting a plurality of clutch elements to different combinations or patterns of engaged and disengaged positions which are determined in the first instance by electric control signals.

A related object is to provide a selective clutch shifting mechanism in which positive clutch elements are shifted only when in certain predetermined angular positions, and only when the input drive thereto has a low or zero velocity thereby avoiding clash or damage to the clutch elements.

The advantages and results flowing from the these and other objects of the invention will be apparent from the following description of one embodiment of the invention, such description to be taken in conjunction with the accompanying drawings, in which:

FIGURE 1 is a simplified elevational view of a machine tool, specifically a lathe, with which the present invention may, for example, be employed;

FIG. 2 is a simplified, diagrammatic illustration, partially in block-and-line form, of a control system which includes apparatus embodying the present invention and which is applied to control the motions of the carriage and cross slide of the lathe;

FIGS. 3A and 3B illustrate the paths and successive increments for a simple, exemplary program of the motion to be executed;

FIG. 4 shows a sample record having spaced sets of indicia thereon representing the successive movements shown in FIG. 3A.

FIG. 5 is a diagrammatic illustration of the two multi-ratio transmissions shown in FIG. 2, together with the slow-down and shifting mechanisms associated therewith;

FIG. 6 is a diagrammatic illustration showing the details of one multi-ratio transmission including the planetary gear sets and shiftable clutches which form the parts thereof;

FIG. 7 is a fragmentary elevational view showing two of the solenoid and latch mechanisms employed to selectively shift positive clutches in the transmissions;

FIG. 7A is a similar to FIG. 7, but shows a rocker and pin for a different clutch in one of the transmissions;

FIG. 8 is a perspective illustration of a latched rocker employed in the mechanism of FIG. 7.

FIG. 9 is an enlarged vertical section taken substantially along the line 9—9 in FIG. 7 and showing details of the selective clutch-shifting mechanism;

FIG. 10 is a detail view taken in section substantially along the line 10—10 in FIG. 9;

FIGS. 11 and 12 are similar to FIG. 7, but respectively show the operation of the shifting mechanism as a frame is moved forwardly and rearwardly;

FIG. 13 is an end view, partially in section, of the slow-down unit and shifting cams;

FIG. 14 is a fragmentary, enlarged illustration corresponding to a portion of FIG. 13 and showing a cam follower in its engaged position;

FIG. 15 is a fragmentary section taken substantially along the line 15—15 in FIG. 13 and showing details of the cams and solenoid for actuating the slowdown unit and shifting mechanism;

FIG. 16 is a fragmentary detail view taken in section substantially along the line 16—16 in FIG. 14;

FIG. 17 is a fragmentary section taken substantially along the line 17—17 in FIG. 15;

FIG. 18 is a diagrammatic illustration of the slow-down unit employed in association with the multi-ratio transmissions;

FIG. 19 is a vertical section of the slowdown mechanism and illustrates in more detail what is shown diagrammatically in FIG. 18;

Figure 29:
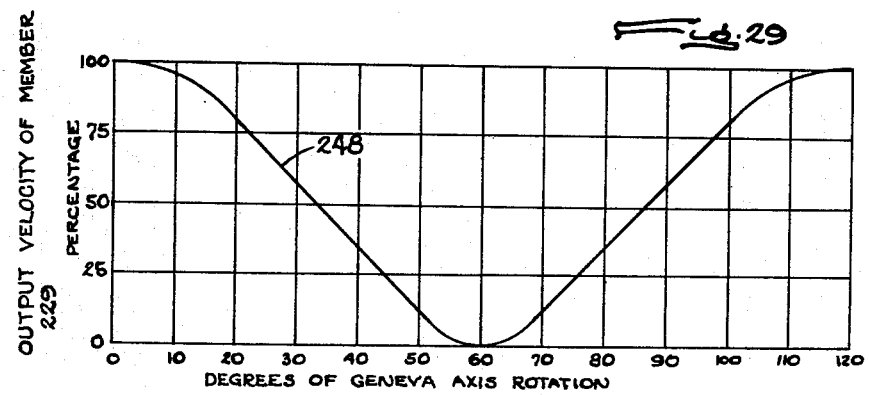
Figure 28:
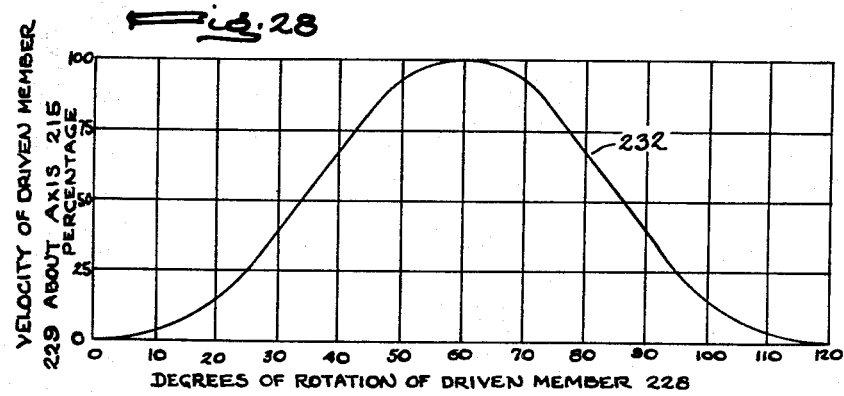

FIGS. 20 and 21 are detail sections taken substantially along the lines 20—20 and 21—21, respectively, in FIG. 19;

FIG. 22 is a developed illustration of the clutch shown in FIG. 19, and which resets automatically after each cycle of 120 degrees rotation;

FIGS. 23–27 are stop-motion views of the Geneva mechanism employed in the slowdown unit during successive stages of one cycle of operation;

FIG. 28 is a graph showing the variation of velocity imparted to the driven member of the Geneva mechanism by the driver during one cycle of operation;

FIG. 29 is a graph showing the variation in the net velocity of the driven member of the slowdown unit, resulting from subtraction of the Geneva motion from the normal motion;

FIG. 30 is a schematic illustration of the tape reader which is shown in block form by FIG. 2; and FIG. 31 is a schematic wiring diagram of exemplary electrical controls.

While the invention has been shown and will be described in some detail with reference to a particular embodiment thereof, there is no intention that it thus be limited to such detail. On the contrary, it is intended here to cover all modifications, alternatives and equivalents falling within the spirit and scope of the invention as defined by the appended claims.

ILLUSTRATIVE ENVIRONMENT AND GENERAL DESCRIPTION

The present motion transmitting apparatus may be employed in a variety of applications, and is not limited in its advantageous uses to either programmed motion systems or the control of machine tools. However, in order to make clear one background in which the invention may be employed, it will be described as it is used in a programmed motion control system of the type disclosed in the above identified Swanson et al. application, and specifically in a system for controlling a machine tool wherein the relative movement between a cutter and a workpiece along two or three axes is to be controlled from a punched tape or the like in order to cut a workpiece automatically to a predetermined shape, size, and contour. For purposes of fully explaining the invention, it will be described below as embodied in a system for controlling the longitudinal and transverse motions of a cutting tool in an engine lathe, so that the desired shape is formed on a workpiece chucked in and continuously rotated by a spindle.

Referring now to FIGS. 1 and 2, a lathe 40 is there diagrammatically shown as having a spindle 41 mounted at one end of a bed 42 and spaced from a tailstock 43. A chuck 44 carried by the spindle is adapted to hold a workpiece 45 which is to be machined by the action of a cutter 46 movable axially and transversely relative to the workpiece. The cutting tool 46 is rigidly fixed in a tool holder 48 supported on a cross slide 49 which is slidable along ways formed on a carriage 50. This back and forth motion of the cross slide 49 is here termed movement along the X axis, with positive motion being toward the front of the lathe, and negative motion being toward the back of the lathe. To produce this motion of cross slide 49 and the cutter 46 along the X axis, the cross slide 49 is equipped with a nut 51 threadably engaged with a lead screw 52 rotated by means of a right-angle drive mechanism 53 disposed on the carriage 50. Input rotation to the drive mechanism 53 is provided by a splined shaft 54 which is integral with or drivingly connected to the output shaft 55 of an X axis multi-ratio feed transmission 56.

The carriage 50 itself is slidably supported on ways formed on the bed 42 so that it has freedom to move axially of the spindle 41 and workpiece 45. This motion is termed motion along the Z axis, the Z+ direction of movement being to the left, and the Z− direction being to the right. Thus, movement of the carriage 50 on the lathe bed and movement of the cross slide 49 on the carriage can produce motion of the cutter 46 both axially and radially of the rotating workpiece 45, these directions of movement being at right angles and being here designated as along the Z and X axes.

To produce controlled motion of the carriage 50 back and forth along the Z axis, it is equipped with a nut 58 threadably engaged with the longitudinal lead screw 59 integrally joined to or drivingly connected with the output shaft 60 of a Z axis multi-ratio feed transmission 61. Not only may the two transmissions 56, 61 be set or shifted to provide any one of a plurality of drive ratios, but they may also be shifted to rotate their output shafts in either forward or reverse directions, so that the cutter 46 is moved either in a positive or negative sense along the X and Z axes.

As here shown, the spindle 41 is driven from a variable speed spindle motor 63 which is energized from a spindle motor controller 64. It will be understood, of course, that instead of a pulley or chain drive between the spindle motor and the spindle itself a variety of other drives including multi-ratio gearing may, if desired, be employed.

To supply power to the input shafts 65, 66 of the respective transmissions 56, 61, a feed motor 68 is connected to drive a main power shaft 69 forming the input to a slowdown unit 70 which will be described in more detail below. For the present, it may be observed that the output member or gear 71 of the slowdown unit drives a pair of gears 72 and 73 which are coupled to or integral with the respective input shafts 65 and 66 of the X and Z axis multi-ratio transmission. The feed motor 68 is preferably of a variable speed type, and is controlled in its speed of operation by a suitable motor controller 74.

In order to coordinate the motions of the movable member or cutter 46 along the X and Z axes according to a predetermined program, an elongated record 75 is transported in synchronism with the main shaft 69 through a reader 76. The latter produces successive sets of signals in the form of contact closure or voltages, each set corresponding to the information represented by one row of indicia on the record. The elongated record may take a variety of forms, but will here be discussed as a punched paper tape passed from a supply reel (not shown) through the reader 76 to a take-up reel (not shown). This feeding movement of the tape 75 through the reader is produced by a direct drive in the form of a non-slip belt 78 trained over pulleys 69a and 78a disposed respectively on the main shaft 69 and the input shaft of the tape reader.

Signals produced by the tape reader 76 are routed over the channels represented by lines and arrows in FIG. 2. First, signals from the tape reader pass selectively to X and Z axis decoders 79 and 80 which, in turn, supply electrical signals to the transmissions 56, 61 to determine the particular drive ratios to which clutches therein will be shifted. The actual shifting of these transmissions is initiated, as hereinafter described, by the slowdown unit 70 which receives an actuating signal at the proper times from the tape reader 76 (via the Z axis decoder, as made clear below) and which operates to assure that the transmission clutches are shifted without clash or damage. The slowdown unit 70 performs two important functions, viz., (1) it reduces the velocity of input shafts 65, 66 of the two transmissions substantially to zero at the instant the transmission clutches are shifted; and (2) it assures that an exactly predetermined angle of rotation of the transmission input shafts will be lost, relative to rotation of the main shaft 69, when each cycle of slowdown and clutch shifting occurs.

The organization and cooperative operation of the various components shown only diagrammatically in FIG. 2 will be described in considerably greater detail by the following portions of the specifications. It will become apparent as the description proceeds that by virtue of the particular mechanical organization of certain components and their interconnections through electrical controls that the movable member 46 may be put through any program of successive motion steps along the X and Z axes so as to perform roughing cuts, finishing cuts, tapering, cut-off, and other desired machining operations on the workpiece 45 which are necessary to produce the desired shape and dimensions thereof. These operations are produced automatically from indicia on the punched tape 75 which represents the desired motion program.

SIMPLIFIED, EXEMPLARY MOTION PROGRAM

It will be helpful at the outset to describe a very much simplified program of motion, and indicate how such a program of successive increments of movement is initially represented on an elongated record or punched tape. Referring to FIG. 3A, assume that the workpiece 45 there shown is held in the lathe chuck 44, and that it is desired to move the cutter 46 from the illustrated starting point $a$ so as to take a finishing cut along the paths shown by dotted lines. The tool will first be moved inwardly (—X direction) from point $a$ to point $b$, so that its cutting edge is at the radial position required to cut a desired diameter on the right shank of the workpiece 45. Then, the cutter will be moved to the left (+Z direction) until it reaches point $c$, and so that the surface of the shank is machined to the desired diameter. Finally, the cutter will be moved diagonally from point $c$ to point $d$ by simultaneous outward (+X direction) and leftward (+Z direction) so that the resultant motion is at a desired angle, here shown as approximately 26.5° from the Z axis. This results in cutting of a tapered surface on the workpiece 45.

Although the three successive motions of the cutter have been here purposely selected to be relatively simple, it will be apparent from what follows that any desired complex shape or dimension may with the present system be cut from a workpiece, including roughing cuts, finishing cuts, tapers, fillets, and cut-offs.

The cutter motions illustrated in FIG. 3A have been shown to a larger scale in FIG. 3B. It will be seen that the cutter is to be moved from the starting point $a$ 1.244 inches inwardly to point $b$, then .981 inches to the left to point $c$, and then simultaneously .510 inch outwardly and 1.020 inches to the left so as to produce the tapered or angled cut between points $c$ and $d$. This series of motions is broken up into five separate distinct increments of movement, as labeled in FIG. 3B, inasmuch as it is desirable to consider continuous motion in one direction as constituted by a multiple of small distances (here .030 inch) followed by a "remainder" of some distance between .001 and .029 inch. Thus, the #1 increment in FIG. 3B is 1.230 inches, constituted by 41 times .030 inch. The #2 increment in FIG. 3B is a remainder of .014 inch, thus making the sum of the #1 and #2 increments equal to 1.244 inches. The #3 and #4 increments have respective lengths of .960 and .021 inch, the former being equal to 32 times the selected small distance of .030 inch. Together, these two increment lengths equal the desired total of .981 inch. Finally, the #5 increment of motion is constituted by a length of .510 (17 times .030) inch along the X axis and 1.020 (34 times .030) inches along the Z axis.

A sample length of record or punched tape 75 having indicia thereon in the form of punched holes representing the foregoing program of incremental movements is shown in FIG. 4. The tape may be a standard, commercially available paper tape one inch in width and with eight longitudinal columns thereon for receiving character-representing indicia such as punched holes. As shown, the columns are numbered from 1 through 8 from right to left, there being a row of closely spaced feed sprocket holes between the third and fourth columns. The feed sprocket holes are spaced apart lengthwise of the tape by small, uniform distances which will here be referred to as "unit distances" or pitches. Each sprocket hole lies on and defines one transverse row across the tape, and a punched hole may be either present or absent in each of the columns within each row.

Although the coding system for representing various symbols and numbers on the punched tape may vary considerably, the first five columns of the punch tape 75 in the present instance are used to represent any decimal number between 0 and 31 according to the well-known binary system. A hole appearing in any column within a given row is considered to represent a binary "1", and the absence of a hole represents a binary "0". Thus, any transverse row of holes on the tape may represent any number, as shown by the following table:

*Table I*

| Column Number | 5 | 4 | 3 | 2 | 1 | Decimal Value |
|---|---|---|---|---|---|---|
| Binary Value | $2^4$ | $2^3$ | $2^2$ | $2^1$ | $2^0$ | |
| | 0 | 0 | 0 | 0 | 0 | 0 |
| | 0 | 0 | 0 | 0 | 1 | 1 |
| | 0 | 0 | 0 | 1 | 0 | 2 |
| | 0 | 0 | 0 | 1 | 1 | 3 |
| | 0 | 0 | 1 | 0 | 0 | 4 |
| | 0 | 0 | 1 | 0 | 1 | 5 |
| | 0 | 0 | 1 | 1 | 0 | 6 |
| | 0 | 0 | 1 | 1 | 1 | 7 |
| | 0 | 1 | 0 | 0 | 0 | 8 |
| | 1 | 1 | 1 | 1 | 0 | 30 |
| | 1 | 1 | 1 | 1 | 1 | 31 |

The foregoing Table I has not been made complete as to all decimal numbers between 0 and 31 since the code employed is the standard binary notation familiar to those skilled in the art.

The sixth, seventh, and eighth columns on the punch tape 75 are employed to receive punched holes which represent alphabetical or sign characters according to a predetermined code, such characters indicating the nature or purpose of the numerical information represented in the first five columns of the same transverse row. The different characters or symbols which are employed in the present instance are set forth in the following table, and in which a "1" represents a hole in the tape and a "0" represents the absence of a hole:

*Table II*

| Column Number | 8 | 7 | 6 | SYMBOL |
|---|---|---|---|---|
| | 0 | 0 | 0 | +X |
| | 0 | 0 | 1 | —X |
| | 0 | 1 | 0 | +Z |
| | 0 | 1 | 1 | —Z |

The symbols +X, —X, +Z and —Z represent the four possible directions of movement of the cutter. The symbol Z is designated by a hole in the seventh column of the punched tape while the plus or minus sign is represented by the presence or absence of a hole in the sixth column. A row of holes representing the symbol X always immediately follows a row of holes representing a Z symbol, so that the absence of holes in the seventh and eighth columns may be considered to designate an X character, and the absence or presence of a hole in the sixth column of that row indicates whether the X character is positive or negative.

It will be apparent that a given row on the tape may represent any Z code between Z0 and Z31, and that any of these may be positive or negative. Similarly, a given row on the punch tape may represent a positive or negative X code between X0 and X31.

As will be explained below, an X or Z code not only represents the direction, i.e., plus or minus, along the respective axes but also represents the desired ratio to which the corresponding transmission 56 or 61 is to be set during the succeeding increment of motion. Stated another way, a code such as +Z3 designates that the travel of movable element or cutter 46 is to be to the left along the Z axis for the following increment of movement, and that the rate of movement is to be 0.003 inch for each predetermined amount of angular rotation (here ½ revolution) of the Z axis transmission input shaft 66. Thus, any net drive ratio between 0 and .031 inch per half revolution of the transmission input shaft may be imparted to the cutter 46 either along the X or Z axes, as will become apparent from the following detailed description of the two transmissions 56 and 61.

The exemplary length of tape in FIG. 4 may also carry indicia in the form of punched holes which represent not only the successive movements illustrated in FIG. 3B, but also additional information representing desired spindle speeds, feed ratios, and other information. Because these control functions have no bearing on the invention herein claimed, they will not be illustrated or described, but reference may be made to the above-mentioned Livingston et al. application for an understanding thereof.

MULTI-RATIO TRANSMISSIONS AND SHIFTING MECHANISMS

Referring now to FIG. 5, the X and Z multi-ratio transmissions 56 and 61 are there shown as each comprising two differential units 56a, 56b and 61a, 61b drivingly interposed between the respective input shafts 65, 66 and the respective output shafts 55, 60. The two input shafts 65 and 66 are dirven in unison from the gear 71 which forms the output member of the slowdown unit 70, the latter normally transmitting rotational drive from the feed motor 68 and the continuously rotating main shaft 69.

Because the X and Z axis transmissions 56 and 61 are identical, a description of one will suffice for both. Referring to FIG. 6, the Z axis transmission 61 comprises a plurality of planetary gear sets associated with selectively shiftable, two-position positive clutches which afford a total of thirty two possible drive ratios between the input shaft 66 and the output shaft 60, as well as a shiftable, two-position clutch which selectively causes the output shaft to rotate in a positive or negative sense relative to the input shaft.

While other configurations of multi-ratio transmissions may be employed, the one here shown in FIG. 6 has associated with its input shaft 66 six positive clutches C1, C2, C4, C8, C16 and Cr. The first five of these clutches are substantially identical, and thus a description of one will suffice for all. Considering the clutch C16, its output member 97 is in the form of a sleeve journaled on the shaft 66 with freedom to rotate relative to the latter, such sleeve having a gear G16 fixed to or integral therewith. Carried by the output member 97 and axially shiftable relative thereto are a pair of diametrically spaced bolts 94 pinned to an axially shiftable element or collar 95. The bolts extend through holes formed in spaced flanges on the member 93, and according to whether the collar 95 is shifted to the right (as shown) or the left, the output member 97 will be locked either to a stationary partition 100 or to a flange 101 integral with the shaft 66, those latter two parts having holes therein to receive the opposite extremities of the bolts 94. Thus, when the clutch C16 is in its "unactuated" or "actuated" states (the former being shown), the output member 97 will be either held stationary or rotationally driven in unison with the input shaft 66. The shiftable element or collar 95 may be shifted axially between its first and second positions by rocking motion of a yoke Y pivoted at 96 and having its extremity engaged with but rotatable relative to the collar.

In like manner, the clutches C1, C2, C4, C8 and C16 all have output members 97 which may be either held stationary or locked to the shaft 66 depending upon whether the collar 95 and bolts 94 associated therewith are shifted to first or second positions, respectively.

The clutch Cr is a selective reversing clutch. That is, a shaft 102, which is rotationally driven in a manner to be explained, carries thereon an axially shiftable collar 103 which may be shifted to the right (as shown) or the left by rocking movement of a yoke Y pivoted at 105. When the member 103 is in the position illustrated, a gear 107 integral therewith meshes with an idler 106 which, in turn, drives a gear 108 fixed to the output shaft 60. This drive connection will be termed the "forward" or positive drive direction. On the other hand, if the shifting yoke Y is rocked counterclockwise about its pivot 105 to shift the collar 103 to the left, then the gear 107 will mesh directly with and drive a second gear 109 which is also fixed to the output shaft 60. Thus, under these circumstances the output shaft 60 will be driven in the opposite direction even though the shaft 102 continues to rotate in the same direction. By their relative diameters and numbers of teeth, the drive ratio between the shaft 102 and the output shaft 60 afforded by the gears 106, 107, 108 and 109 will be the same whether the collar 103 is shifted to its "forward" or "reverse" positions.

From what has been said, it will be apparent that the plurality of gears G1, G2, G4, G8 and G16 are formed on the respective output members of the clutches C1, C2, C4, C8 and C16. Those gears may either be held stationary or rotated in unison with the input shaft 66. These gears each form one input to an array of tandemly-connected planetary gear sets, the last of which drives the shaft 102 and thus drives the output shaft 60 through the reversing clutch Cr.

The first differential gear unit 61a is a compound set of differential gears comprising first, second and third input members or sun gears A, E and J which are respectively driven from the gears G1, G2 and G16 through gears L, M and O. The output shaft 110 for the first planetary gear unit 61a is integral with a sun gear F. This latter sun gear is coupled to the input sun gear J by a planet gear couplet H, N which is journaled for bodily movement with, but rotation relative to, a planet carrier K. The sun gear A meshes with an idler gear B also journaled on the planet carrier K, and the idler B in turn is coupled to a sun gear E by a planet gear couplet C, D carried by and rotatable relative to the planet carrier K. This compound differential unit 61a, therefore, has three inputs formed by the gears G1, G2 and G16, and has a single output formed by the gear F and a shaft 110 integral therewith.

The second planetary unit 61b is identical to the first, although its first input is formed by the output of the first unit. That is, the first input for the unit 61b is constituted by the shaft 110 and a sun gear J2 integral therewith. The remaining two inputs to the second unit 61b are constituted by sun gears A2 and E2 which are integral with gears L2 and M2, respectively, meshed with and driven from the gears G4 and G8 associated with the clutches C4 and C8. The output of the second planetary gear unit 61b is formed by sun gear F2 and the shaft 102 which is integral therewith. Thus, the two gear units 61a and 61b are connected in tandem and together form one planetary multi-ratio transmission having five input members G1, G2, G4, G8 and G16 which may individually be held stationary or driven in unison with the input shaft 66. This means that the five input sun gears A, J, E, A2 and E2 may all either be held stationary so as to have zero velocity, or may be driven at a predetermined ratio in speed relative to the speed of the input shaft 66, depending upon the ratios of the gears which connect the latter shaft to the input sun gears when the respective clutches are engaged.

In order to make clear just how the multi-ratio planetary transmission shown in FIG. 6 can be made to selectively produce any one of thirty-two possible drive ratios between 0 and .031 inch of travel of the carriage 50 (FIG. 2) per half revolution of the input shaft 66, it may be observed that analysis by known techniques (and which will not be repeated here in the interests of brevity) will show that the speed $W_F$ of the output 110 of the first compound differential unit 61a may be expressed in terms of the speeds $W_A$, $W_J$ and $W_E$ of the respective sun gears A, J and E. The relationship may be expresesd by the equations:

$$W_F = \frac{W_E W_A \left(\frac{A}{C} \times \frac{D}{E}\right)}{1 - \frac{A}{C} \times \frac{D}{E}} \cdot \left(1 - \frac{J}{H} \times \frac{G}{F}\right) + W_J \times \frac{J}{H} \times \frac{G}{F} \quad (1)$$

$$W_F = W_J \left(\frac{J}{H} \times \frac{G}{F}\right) + W_E \frac{\left(1 - \frac{J}{H} \times \frac{G}{F}\right)}{\left(1 - \frac{A}{C} \times \frac{D}{E}\right)} -$$

$$W_A \left(\frac{J}{H} \times \frac{G}{F}\right) \frac{\left(1 - \frac{J}{H} \times \frac{G}{F}\right)}{\left(1 - \frac{A}{C} \times \frac{D}{E}\right)} \quad (2)$$

In the foregoing equations, the letter symbols without subscripts represent the number of teeth or the diameter of the respective gears, and the W symbols represent rotational speeds of the respective gears identified by letter subscripts. Assuming that the various gears shown in FIG. 6 have the numbers of teeth there indicated in parentheses, then it will be apparent that $$\frac{J}{H} \times \frac{G}{F} = \frac{32}{32} \times \frac{26}{39} = \frac{2}{3} \quad (3)$$

and that $$\frac{A}{C} \times \frac{D}{E} = \frac{44}{22} \times \frac{44}{44} = -2 \quad (4)$$

The minus sign appearing at the right in Equation 4 results from direction reversal produced by the idler gear B.

Substituting the numerical values of gear teeth or diameter ratios from Equations 3 and 4 into Equation 2 we obtain:

$$W_F = \frac{2}{3} W_J + \frac{1}{9} W_E + \frac{2}{9} W_A \quad (5)$$

Now inasmuch as the input speed of the sun gear J2 in the second planetary unit is the same as the output speed $W_F$ of the first unit, and since the second gear unit is exactly like the first, the output speed of the final gear F2 (and of the shaft 102) may thus be expressed by an equation similar to Equation 5 in terms of the three input speeds, viz.:

$$W_{F2} = \frac{2}{3} W_F + \frac{1}{9} W_{E2} + \frac{2}{9} W_{A2} \quad (6)$$

Substituting $W_F$ from Equation 5 into Equation 6:

$$W_{F2} = \frac{12}{27} W_J + \frac{2}{27} W_E + \frac{4}{27} W_A + \frac{3}{27} W_{E2} + \frac{6}{27} W_{A2} \quad (7)$$

It will be apparent from FIG. 6 that a particular number of gear teeth or a particular ratio of diameters are assigned to the gears G1, G2, G4, G8 and G16 which mate with the gears L, M, L2, M2 and O. Thus the respective drive ratios from the shaft 66 to the five input sun gears when the five clutches C16, C1, C2, C4 and C8 are engaged have the values 4:3, 1:2, 1:2, 4:3 and 4:3, respectively. Assuming that all the clutches are actuated and that the input shaft 66 is rotating at a speed $W_i$, the speeds of the different input gears will be:

$$J = \frac{4}{3} W_i \quad (8)$$

$$E = \frac{1}{2} W_i \quad (9)$$

$$A = \frac{1}{2} W_i \quad (10)$$

$$E2 = \frac{4}{3} W_i \quad (11)$$

$$A2 = \frac{4}{3} W_i \quad (12)$$

Putting these values into Equation 7, the speed $W_{F2}$ of the final output gear F2 (and of the shaft 102) may be expressed:

$$W_{F2} = \frac{16}{27} W_i + \frac{1}{27} W_i + \frac{2}{27} W_i + \frac{4}{27} W_i + \frac{8}{27} W_i \quad (13)$$

The five successive terms on the left side of Equation 13 are contributed by drive through the respective clutches C16, C1, C2, C4 and C8. If any of these clutches is disengaged so that it holds the corresponding sun gear stationary, the corresponding term in Equation 13 becomes zero. Thus, the ratio of drive $W_{F2}/W_i$ between the input shaft 66 and the output shaft 60 will have the value:

$$\frac{W_{F2}}{W_i} = k[1(C1) + 2(C2) + 4(C4) + 8(C8) + 16(C16)] \quad (14)$$

In the foregoing equation, the symbol $k$ is simply a factor of proportionality, and the C symbols which appear in parentheses will have values of either 0 or 1 depending upon whether the corresponding clutch is respectively deactuated or actuated, i.e., its output member 93 held stationary or drivingly connected to the shaft 66. Of course, the drive ratio $W_{F2}/W_i$ is not effected by the shifting of the reverse clutch Cr, the latter determining only whether the output shaft 60 rotates in a positive or negative direction relative to the input shaft 66.

To give a specific example, the total ratio of the drive between the input shaft 66 and the carriage 50 (FIG. 2) is made in the present instance such that when $W_F/W_i$ equals 1 (i.e., only the clutch C1 is actuated), then the carriage 50 will be moved .001 inch for each half revolution of the input shaft 66. This means that as different combinations of the five clutches are engaged, the translation ratio of the displacement of the carriage 50 for each half revolution of the input shaft 66 will be as follows:

*Table III*

1=actuated clutch
0=de-actuated clutch

| Code | Clutch | | | | | Translation of Carriage 50 In Inches Per ½ Rev. of Shaft 66 |
|---|---|---|---|---|---|---|
| | C1 | C2 | C4 | C8 | C16 | |
| Z0 | 0 | 0 | 0 | 0 | 0 | .000 |
| Z1 | 1 | 0 | 0 | 0 | 0 | .001 |
| Z2 | 0 | 1 | 0 | 0 | 0 | .002 |
| Z3 | 1 | 1 | 0 | 0 | 0 | .003 |
| Z4 | 0 | 0 | 1 | 0 | 0 | .004 |
| Z5 | 1 | 0 | 1 | 0 | 0 | .005 |
| Z6 | 0 | 1 | 1 | 0 | 0 | .006 |
| Z7 | 1 | 1 | 1 | 0 | 0 | .007 |
| Z8 | 0 | 0 | 0 | 1 | 0 | .008 |
| Z9 | 1 | 0 | 0 | 1 | 0 | .009 |
| Z10 | 0 | 1 | 0 | 1 | 0 | .010 |
| Z11 | 1 | 1 | 0 | 1 | 0 | .011 |
| Z12 | 0 | 0 | 1 | 1 | 0 | .012 |
| Z13 | 1 | 0 | 1 | 1 | 0 | .013 |
| Z14 | 0 | 1 | 1 | 1 | 0 | .014 |
| Z15 | 1 | 1 | 1 | 1 | 0 | .015 |
| Z16 | 0 | 0 | 0 | 0 | 1 | .016 |
| Z17 | 1 | 0 | 0 | 0 | 1 | .017 |
| Z18 | 0 | 1 | 0 | 0 | 1 | .018 |
| Z19 | 1 | 1 | 0 | 0 | 1 | .019 |
| Z20 | 0 | 0 | 1 | 0 | 1 | .020 |
| Z21 | 1 | 0 | 1 | 0 | 1 | .021 |
| Z22 | 0 | 1 | 1 | 0 | 1 | .022 |
| Z23 | 1 | 1 | 1 | 0 | 1 | .023 |
| Z24 | 0 | 0 | 0 | 1 | 1 | .024 |
| Z25 | 1 | 0 | 0 | 1 | 1 | .025 |
| Z26 | 0 | 1 | 0 | 1 | 1 | .026 |
| Z27 | 1 | 1 | 0 | 1 | 1 | .027 |
| Z28 | 0 | 0 | 1 | 1 | 1 | .028 |
| Z29 | 1 | 0 | 1 | 1 | 1 | .029 |
| Z30 | 0 | 1 | 1 | 1 | 1 | .030 |
| Z31 | 1 | 1 | 1 | 1 | 1 | .031 |

In summary, the Z axis multi-ratio transmission 61 may be set to produce any one of thirty-two possible overall drive ratios between its input shaft 66 and its output shaft 60. Thus, any one of thirty-two translation ratios (in mills per half revolution) between the input shaft 66 and the carriage 50 may be selectively obtained. The clutches C1, C2, C4, C8 and C16 need only be actuated in a proper combination or pattern (according to Table III) to produce any one of these drive ratios. It is important to observe, also, that one of the drive ratios is zero, meaning that the carriage 50 will remain stationary (and, indeed, be locked) even though the input shaft 66 continues to rotate when all of the clutches are in their de-actuated or disengaged positions. Moreover, the direction of movement (+ or −) may be determined simply by shifting the clutch Cr to one position or the other.

The X axis transmission is identical to the Z axis transmission. Without further comment, it will be understood that by setting any of the five clutches therein to a particular combination, the cross slide 49 (FIG. 2) may be translated in any rate between 0 and .031 inch per half revolution of the input shaft 65. Moreover, the cross slide 49 may be driven in a positive or negative sense depending upon whether the reversing clutch in the X axis transmission 56 is set to its forward or reverse position.

SELECTIVE CLUTCH SHIFTING MECHANISM

In accordance with one feature of the present invention, provision is made quickly and simultaneously to shift the six clutches in each of the two transmissions 56 and 61 to any desired pattern of actuation, and thus to set each transmission to any one of its several possible drive ratios. Moreover, the particular clutches which are to be shifted to, or left in, their actuated positions are determined in the first instance by a set of electrical signals which represent the desired drive ratio.

The clutch shifting mechanism for accomplishing these functions is associated with the twelve shifter yokes Y shown in FIG. 5. As previously noted, these yokes are movable about pivot supports between clockwise and counterclockwise positions, thereby moving the respective clutch elements or clutch bolts to first or second positions. Since all of the shifter yokes and the mechanisms associated therewith are substantially identical, that one associated with the clutch C16 will first be described. As shown best in FIG. 9, the shifter yoke Y is carried by a pintle 96 which is journaled in a stationary frame member 115, the yoke having a U-shaped portion 116 which engages the collar 95 of the clutch C16 in order to shift it and the bolts 94 fixed thereto axially between their first and second positions. Rigid with the U-shaped portion 116 are a pair of vertically spaced projections 118, 119.

To selectively control or set the clutch yoke Y in its clockwise or counterclockwise position, a shifting frame 120 (FIGS. 5, 7 and 9) extends alongside the projections 118, 119 of all of the yokes. This frame 120 is mounted for longitudinal sliding movement relative to a stationary cocking bar 142 (FIGS. 9 and 10), and may be reciprocated to the left (FIGS. 6 and 7) to a first position, then toward the right (to a second position) after which the frame is returned to the centered or home position. Such a reciprocatory cycle of motion may be imparted to the frame 120 by means of a rotating barrel cam 121 (FIG. 5) having a selectively engaged follower 122 mechanically connected to one end of the frame. As will be detailed below, the follower 122 may be selectively dropped into engagement with the cam 121 and then removed therefrom automatically after the frame has been translated first to the left (as viewed in FIG. 5) and then back to the right.

The shifting frame 120 has inturned upper and lower flanges 124, 125 (FIG. 9) apertured to carry a plurality of members or pins 127 movable back and forth between the first and second positions (up or down) relative to the frame. There is one such pin adjacent the upper and lower projections 118, 119 of each clutch yoke Y, and a particular one of these pins associated with the clutch C16 will be described in connection with FIGS. 7-12.

As shown in FIGS. 7 and 9, the uppermost pin 127 is biased toward its first or upper position by means such as a compression spring 128 interposed between the flange 125 and a collar 129 formed on the pin. However, the pin 127 may be shifted downwardly to its second position by means of a T-shaped rocker 130 (FIGS. 7 and 8) pivoted on the outer side of the frame 120 by a pin or screw 131 and having an inturned arm 132 projecting through an aperture 133 in the frame to engage the upper surface of the pin collar 129. When the rocker 130 is turned clockwise to the position shown in FIG. 7, the arm 132 moves the pin 127 downwardly to its second position.

When the pin 127 is in its first position, it projects upwardly from the frame 120 to engage the upper projection 118 of the associated yoke Y when the frame 120 moves towards the left; and the lower end of that pin is substantially flush with the shifting frame flange 125, so that it will pass freely by without engaging the lower yoke projection 119. On the other hand, when the pin 127 is in its second or lowered position (FIG. 11), its upper extremity will clear the upper yoke projection 118, and its lower extremity will engage the lower yoke projection 119 as the frame 120 moves to the left. Thus, if the pin is in its upper position as the frame 120 moves to the left, the yoke Y will be rocked to its counterclockwise position. Alternatively, if the pin 127 is in its lower position as the frame 120 moves to the left (FIG. 11), its lower extremity will engage the yoke projection 119 and rock the yoke to its clockwise position.

Means are provided to latch the pin 127 in one of its two positions. As here shown in FIG. 7, when the rocker 130 turns to its clockwise position, its upper tip 134 snaps under a latch finger 135 pivoted at 136 to the frame 120 and biased downwardly by a spring 138. To selectively release the latch and permit the spring 128 to raise the pin 127, a solenoid SZ16 is mounted stationary above the latch finger 135 and has a rod 139 depending from its armature with a cross pin 140 projecting beneath that finger. The finger can slide relative to the cross pin as the frame 120 reciprocates. Whenever the solenoid SZ16 is energized and the rod 139 is raised, the latch finger 135 will be raised free of the tip 134 so that the pin 127 is released to its first or upper position.

In order to restore the pin 127 to its lowered or second position as the frame 120 is returned to the right, the stationary cocking bar 142 mounted adjacent the frame 120 is formed with a plurality of slots 143. As the frame 120 and the rocker 130 are moved to the right (FIG. 12) abutment of the lower rocker tip 144 with the right edge of the slot 143 will swing the rocker 130 clockwise, thereby depressing the pin 127 to its lower position and causing the upper tip 134 to snap into engagement with the latch finger 135.

Although the foregoing discussion has been concerned principally with the pin, rocker, latch, and solenoid associated with the clutch C16, it will be apparent from FIGS. 5 and 6 that such assemblies are duplicated and associated with each of the six clutches in the Z axis transmission, as well as with each of the six clutches in the X axis transmission. A single shifting frame 120 carries a first set of six pins 127 on its upper half for the Z axis transmission, and a second set of six pins on its lower half for the X axis transmission. A single stationary bar 142 having spaced slots 143 on its upper and lower edges cooperates with all of the rockers 130 to reset all of the pins 127 to their second or latched positions as the shifting frame moves to the right.

For convenience in following the discussion, the six solenoids associated with the Z axis transmission 61 will be designated SZ1, SZ2, SZ4, SZ8, SZ16 and SZr. The corresponding solenoids of the X axis transmission 56 will be designated SX1, SX2, SX4, SX8, SX16 and SXr.

Because the stationary partitions 100 for the clutches C16, C1 and for the clutches C2, C4 are common (FIG. 6), the bolts 94 for the clutches C1 and C4 must be shifted to the left to be de-actuated or held stationary, whereas the shiftable elements or bolts for the remaining clutches must be moved to the right to be in their "normal" or "de-actuated" positions. Since it is desired that all clutches be shifted to their de-actuated positions (and the clutch Cr to its + position) when the shifting frame 120 moves to the right if none of the solenoids have been previously energized, the rockers 130 for the clutches C1 and C4 are reversed in position relative to that shown in the upper portion of FIG. 7. As shown in FIG. 7a, the rocker 130 for the clutch C1 is pivoted on the right side of the corresponding pin 127, and the spring 128 is arranged to bias that pin downwardly. Thus, the rocker 130 shifts and latches the pin 127 in an upper position when the frame 120 moves to the extreme right, while energization of solenoid SZ1 releases the latch to let the pin move downwardly. It will be apparent from FIG. 6 that the pins 127 for the clutches C16, C2, C8 and Cr will be depressed or raised, respectively, when in their latched or released positions; and the pins 127 for the clutches C1 and C4 will be raised or depressed, respectively, when in their latched or released positions. Thus, when all pins 127 are in their latched positions, and the frame 120 moves to the left, the yokes Y for the clutches C1 and C4, will be moved to, or left in, their counterclockwise positions, and all other yokes will be moved to, or left in, their clockwise positions. All clutches will be de-actuated, i.e., their bolts 94 held stationary by engagement with partitions 100.

OPERATION OF SELECTIVE CLUTCH-SHIFTING MECHANISM

The operation of the clutch-shifting mechanism may now be summarized. Suppose it is desired to set the Z axis transmission 61 to a translation ratio of .021 inch of carriage travel in a positive direction for each half revolution of the input shaft 66. From Table III, supra, it will be seen that the clutches C1, C4 and C16 in the Z axis transmission must be shifted to, or left in, their actuated positions, and the clutch Cr must be shifted to, or left in, its "forward" position.

To accomplish this, a first set of signals or pulses are supplied to the solenoids SZ1, SZ4 and SZ16. The manner in which these signals may be derived from a record such as the punched tape 75 in FIG. 4 will be treated below.

Such momentary energization of the solenoids named above will release the corresponding latch fingers 135 associated with the clutches C1, C4 and C16, so that the associated pins 127 will move to their first or released positions. All pins 127 associated with solenoids not energized will remain in their second or "latched" position, to which they have been previously shifted and latched. This means that the pins 127 (FIG. 6) corresponding to the clutches C1, C4 and C16 will be released to their lower, lower, and upper positions, respectively. The pins 127 for the clutches C2, C8 and Cr will remain latched, i.e., all in their depressed or lowered positions. The cam follower 122 (FIG. 5) is then engaged with the rotating barrel cam 121 (in a manner to be explained) and during the succeeding revolution of that cam, the shifting frame 120 will be moved first to the left, then to the right, and then back to its centered or home position. As the frame moves to the left, the pins 127 for the clutches C1, C2, C4, C8 and Cr will all engage the lower projections 119 of the corresponding yokes Y, thus rocking all of those yokes to their clockwise positions. The pin 127 for the clutch C16 will, by contrast, engage the upper projection 118 of the associated yoke Y, and thus swing the latter to its counterclockwise position. It is assumed that when the yokes are so rocked, the shaft 66 is in an angular position such that the apertures in the shaft flanges 101 are aligned with the holes in the stationary partitions 100, so that the bolts can transfer without clash or damage. The means by which this "line-up" of the shaft 66 at the instant of shifting is accomplished will be explained below. But with the several yokes having been shifted to the positions indicated above, it will be apparent that the clutches C1, C4 and C16 will be actuated, i.e., their bolts 94 engaged in the apertures of the corresponding flanges 101 on the shaft 66; and the corresponding gears A, A2 and J will be affirmatively driven from that shaft. On the other hand, the clutches C2 and C8 will be de-actuated, i.e., their bolts 94 engaged in the apertures of the corresponding stationary partitions 100, so that the gears E and E2 will be held stationary. The clutch Cr will be in the + position shown, so that the output shaft 60 turns in a direction to move the carriage 50 (FIG. 2) in a + direction along the Z axis at a rate of .021 inch per half revolution of the input shaft 66 (see Table III, supra).

If, prior to the motion of the shifting frame 120, some of the clutches and yokes are already in the desired positions, then the corresponding pins 127 will simply not displace those yokes, and the clutches will be left in their original positions.

As the shifting frame 120 returns to the right, the pins 127 therein simply retreat from the yoke projections 118 or 119 and leave the yokes Y in the positions to which they have been moved. However, the lower tips 144 of the rockers 130 which have been previously released will engage the edges of the slots 143 in the cocking bar 142 (see FIG. 12), so that those rockers will be reset or latched and the associated pins returned to their "cocked" or second positions. Of course, those rockers which were not previously released will simply remain in their latched conditions as the frame 120 moves to its extreme right position. Thus, at the end of the complete shifting cycle, all of the pins 127 are in their latched positions, and thus conditioned to shift their respective clutches to the de-actuated state when the motion of the frame 120 is repeated. However, those pins may be selectively released by energization of the corresponding solenoids prior to the next shifting cycle.

The shifting of clutches in the X axis transmission 56 is accomplished in the same manner described for the Z axis transmission, and by the same motion of the shifting frame 120. As shown in FIG. 5, the shifting frame 120 carries along its lower edge a plurality of pins 127 associated with pivoted yokes Y adapted to selectively shift the six clutches in the X axis transmission 56. And, as indicated in the lower portions of FIGS. 7, 9, 11 and 12, the lower portion of the shifting frame 120 has a plurality of solenoid, latch, pin and rocker mechanisms substantially identical to those previously described and which permit selective shifting of clutches in the X axis transmission after energization of a desired combination of the six solenoids associated with the X axis transmission. Thus, it will be assumed without further discussion that the six clutches C1, C2, C4, C8, C16 and Cr in the X axis transmission 56 may be shifted to different position patterns (Table III, supra) when the solenoids SX1, SX2, SX4, SX8, SX16 and SXr (FIG. 5) are first energized in a corresponding combination and the shifting frame 120 is moved to the left, then to the right, and then back again. Therefore, to change or establish a desired ratio of drive for both of the transmissions 61 and 56, it is only necessary to first energize a certain combination of the solenoids associated with the Z axis transmission 61, then to energize a certain combination of the solenoids associated with the Z axis transmission 56, and then to cause the shifting frame 120 to reciprocate first to the left and then to the right. Those clutches in both transmissions which need to be shifted in order to produce the newly desired drive ratios will be simultaneously shifted by the movement of the shifting frame 120 and the action of the pins 127 carried thereby.

SLOWDOWN UNIT AND SHIFT ACTUATION MEANS

The positive, two-position clutches employed in the multi-ratio transmissions transcribed above are desirable where the invention is to be practiced with a high degree of precision in controlling the extents of successive increments of motion. Those positive clutches make the carriage 50 or the cross slide 49 (FIG. 2) move a precisely predetermined distance, dependent upon the ratio or setting of the associated transmissions, for each predetermined amount of rotation of the transmission input shafts. The reasons for and advantages of this will become apparent below.

The use of the positive clutches, rather than clutches of the type which may have some slippage as they are actuated, entails several problems, however. First, the two transmission input shafts 65, 66 must be in predetermined angular positions when the clutch bolts 94 are shifted, so that those bolts or clutch elements will transfer into or out of the mating holes of the shaft flanges 101 or stationary partitions of 100 (FIG. 6). Otherwise, all clutches might not properly transfer, and clash or damage of the bolts (or teeth, if toothed dog clutches are used) would occur. Secondly, the clutch elements of the transmission must be rotating at a relatively low and preferably zero velocity at the instant shifting action occurs in order to provide reliability of operation and to avoid clash or damage. Yet, it would be both difficult and undesirable to stop rotational input drive to the system each time that the clutches are to be shifted. And it is important that the revolutions of a main power shaft have a predetermined accountable relation to the revolutions of the transmission input shafts in order that the lengths of increments of motion can be precisely established from an elongated record or punched tape transported and read in synchronism with the main shaft 69.

It is the purpose of the slow-down unit 70 to overcome all of these difficulties. It initiates the clutch shifting action at the proper instant, i.e., when the transmission input shafts 65, 66 are passing through an angular position at which the clutch bolts may readily transfer. It reduces the speed of the input shafts 65, 66 momentarily so that the clutches may be reliably shifted without damage. And it does this by permitting a main power shaft 69 to continue to rotate while causing the transmission input shafts to lose a precisely predetermined angle of rotation relative to the power shaft 69 each time that a shifting cycle takes place.

Referring to FIG. 5, the slow-down unit 70 is drivingly interposed between a continuously rotating main power shaft (here shown as the shaft 69 of the feed motor 68) and the input shafts 65, 66 of the two transmissions 56, 61. Before describing the slow down unit itself, however, the means for selectively actuating the latter and then reciprocating the transmission shift frame 120 at properly timed instants will first be treated.

SHIFT ACTUATING MECHANISM

To initiate a slow down and shifting cycle, a cycle solenoid CS (FIGS. 5, 13 and 15) will be momentarily energized in a manner made clear below. The armature 160 of this solenoid will move upwardly, as viewed in FIG. 15 (downwardly as seen in FIG. 5), and thus displace a latch member 161 pivoted at 162 in a clockwise direction against the bias of a tension spring 164. Thus, the latch tip 165 will swing clear of a lever 166 (FIG. 14) which mounts a cam follower 168, and the latter drops into the groove 169 of a barrel cam 170 mounted on the main shaft 69. As shown in FIGS. 14 and 17, the lever 166 is free to rock about a horizontal axis by virtue of a collar 171 journaled on a pintle 172, but can also swing about a vertical axis by virtue of a pivot connection 174 to the collar. This provides a gimbal-type pivot connection for the end of the lever 166, permitting the latter to swing vertically up and down as well as horizontally to the left or right. A spring 175 (FIG. 14) connected to a projection 176 extending from the collar 171 biases the lever 166 downwardly.

After the follower 168 drops into the groove 169, it will be moved first to the left (as viewed in FIGS. 15–17) and then back to the right. Thus, a first link 178 connected with the lever 166 will be shifted to the left (FIG. 16) until its sliding lost-motion joint 179 with a second link 180 fully closes, and the latter will then also shift to the left. The link 180 has a universal or gimbal pivot connection 181 with one end of a lever 182 (FIG. 17) pivoted at 184 and bearing at its opposite extremity against a spring-biased rod 185 (FIG. 5). The resultant rocking of the lever 182 in a clockwise direction, and resulting displacement of the rod 185 to the right (FIG. 5) initiates one cycle of the slow-down unit, as will be explained below. The lever 182 is normally biased in a clockwise direction by a compression spring 182a (FIG. 19), and it thus firmly abuts the end of the rod 185. The latter is normally biased to the left (FIGS. 5 and 19) by a compression spring 224, and is shifted to the right only in response to clockwise displacement of the lever 182 by the link 178. Once shifted, however, the rod 185 and the lever 182 remain displaced until release of a limited rotation clutch in the slowdown unit 70, as hereinafter described.

When the cam follower 168 drops into the cam groove 169, a collar 186 on the link 180 drops onto the top of a pin 188 (FIGS. 15–16) and as the link 180 moves to the left, the radial abutment 186a provided by the collar falls behind the pin. As the cam 170 continues to rotate, the groove 169 therein causes the follower 168 to move back to the right beyond its original position and then to return to its original position. The lost motion connection at 179 (FIG. 16) permits this return of the link 178, but the link 180 and the lever 182 remain in their shifted positions. Just as the follower 168 returns to its original position and the cam 170 has rotated only slightly less than one complete revolution from the instant that the follower became engaged therewith, a raised peak 189 (FIG. 13) on a radial reset cam 190 engages a reset roller 191 (FIG. 14) carried by the lever 166. This swings the lever 166 upwardly until the latch tip 165 (FIG. 15) snaps into engagement therewith; and this same motion swings the links 178, 180 upwardly about the pivot connection 181 of the latter to the lever 182, so that the shoulder 186a (FIG. 16) formed by the collar 186 clears the retaining pin 188. The link 180 and the lever 182 may now return to their original positions when the rod 185 moves back to the left at the completion of one cycle of the slowdown unit 70 (FIG. 5). Thus, one revolution of the cam 170 causes displacement of the lever 182 by virtue of the action of the cam follower 168 and then resets the cam follower to its original retracted position. If the solenoid CS should be energized a second time before the slowdown unit 70 completes a first cycle of operation, the link 180 will still be in its shifted (left) position. This means that as the lever 166 and the link 178 swing downward, the collar 186 (FIG. 16) will fall on the left side of the pin 188, so that the lever 182 remains displaced in a counterclockwise direction to produce a second cycle of operation of the slowdown unit. This avoids impacts on the linkages when two slowdown cycles are to be produced in succession.

As the follower 168 is shifted to its extreme right (as viewed in FIG. 15), a rod 194 pivoted at 193 to the extremity of the lever 166 is similarly shifted to the right. As shown in FIG. 17, the rod 194 is formed with a pilot tip 195 which passes freely through an aperture in a latch member 196. However, when the rod 194 is shifted to its extreme right, a radial shoulder 194a thereon abuts the latch member 196 and deflects the latter counterclockwise (FIG. 15) about its pivot mounting 198 and against the yielding bias of a tension spring 199. This retracts the latch tip 200 clear of a lever 201 which has a gimbal connection at 202 (FIG. 17) similar to that previously described for the lever 166. The lever 201 carries the cam follower roller 122 previously mentioned and which, by release of the latch 196, is thus lowered into engagement with the groove 121a of the barrel cam 121 mounted on and rotating in unison with the main shaft 69. This displacement of the rod 194 to the right and the release of the latch 196 occurs just before the lever 166 is reset and latched; and this is just before the first barrel cam 170 has completed one revolution from the instant that its cam follower 168 drops into engagement. Thus, after the cycle solenoid CS has been energized, the cam follower 168 and the lever 166 execute one cycle of shifting the lever 182 during a first revolution of the power shaft 69, and then release the second lever 201 and cam follower 122 so that the latter are operative during the succeeding or second revolution of the main shaft 69.

The groove 121a of the barrel cam 121 is so shaped that the follower 122, when engaged therewith, will move first to the left, then to the right, and then back to a centered position, as viewed in FIGS. 15 and 17. A pitman 204 pivotally connected at its opposite ends to the lever 201 and the shifting frame 120 (see FIG. 5) thus produces the above-described left, right, and return motion of the shifting frame 120. The barrel cam groove 121a is so shaped that this motion of the shifting frame toward the left (and the resulting transfer of clutches in the multi-ratio transmissions) occurs when the main shaft 69 is passing through a particular angular position during its second revolution following the initial release of the cam follower 168 by energization of the solenoid CS.

As an incident to lowering of the lever 201, a roller 205 carried thereby is brought into engagement with a radial cam 206 fixed to or integral with the barrel cam 121. This radial cam has a single high point or peak thereon (not shown) but similar to the high point 189 shown in FIG. 14 which will swing the lever 201 upwardly about its gimbal connection at 202 after the follower 122 has been engaged with the cam 121 during substantially one revolution of the latter. This upward movement of the lever 201 causes the latch tip 200 (FIG. 15) to snap into engagement therewith and thus restores the follower 122 to its disengaged position until the cycle of operation is repeated. Thus, all parts are restored to their original positions after the main shaft 69 has rotated two revolutions following the release of the first cam follower 168. A second cycle of operation may be started at any time by again momentarily energizing the solenoid CS. During the cycle of operation of the two cams 170, 121, the lever 182 is momentarily rocked clockwise about its pivot 184 (FIG. 17) and the shifting frame 120 (FIGS. 5 and 6) is reciprocated first to the left and then to the right.

THE SLOWDOWN UNIT

The slowdown unit 70 is shown in diagrammatic form by FIGS. 5 and 18 and in somewhat more detail by FIG. 19. This slowdown unit will be described first as an individual mechanism, and its cooperative connections and operation with the rest of the system can then be made clear.

Referring to FIGS. 5, 18 and 19, the input member for the slowdown unit may be considered as a planet carrier or a revolving carriage 210 which is adapted to be continuously driven in one direction of rotation. For such drive, the carriage mounts an input gear 211 which, as shown in FIG. 5, is driven directly and positively from continuously rotating the main shaft 69 by speed reducing gears 212, 213 and 214. The ratio of the latter gears is chosen, in the present instance, such that the carrier 210 is driven continuously at one-sixth the speed of the main shaft 69, and in clockwise direction as viewed in FIG. 20.

The carrier 210 is journaled for rotation about a first axis 215 (FIG. 18) and comprises axially spaced flanges 216, 218 which journal a shaft 219 so that the latter not only bodily moves with the carrier 210 but has freedom to rotate about a second axis 220 radially displaced from the first axis 215. The carrier 210, in the present instance, also includes a counterweight 221 connected between the flanges 216, 218 and diametrically opposite from the shaft 219. The central portion 222 of the carrier 210 is hollow and contains the rod 185 referred to above, this rod being biased to the left by a compression spring 224. Pins 225 extending through elongated slots in the central portion 222 connect a shifting collar 226 (FIG. 19) with the rod 185, so that the collar will be shifted to the right or to the left, as the rod 185 moves axially.

In accordance with an important feature of the slowdown unit, an intermittent motion, cyclically operable device is drivingly interposed between the carrier 210 and an output member which, in the present instance, is the gear 71. This cyclically operable, intermittent drive device includes means for normally producing a direct drive between the carrier 210 and the output member 71, and selectively operable means which, when actuated through one cycle of operation, causes the output member to first slow down and then speed up while the carrier 210 continues to rotate.

As embodied in FIGS. 18 and 19, a Geneva mechanism is interposed between the carrier 210 and the output member 71, this mechanism being arranged such that it normally locks the two for rotation in unison. The Geneva mechanism includes a driver member 228 fixed to the shaft 219 and thus journaled on the carrier 210 for rotation about the second axis 220, and a driven member 229 which is journaled for rotation about the first axis 215 and either integral with or connected to the final output member 71. The driver member, as here shown, comprises three rollers 230 mounted at 120° intervals around a circular part fixed to the shaft 219, these rollers being sized to enter six radial slots 231 formed at 60° intervals (see FIG. 20) in the face of the driven member 229. As is well known in the art of Geneva mechanisms if the driver member 228 is rotated 120° at constant speed about its own axis 220 from a position in which one of the rollers 230 is just entering one of the slots 231, the driven member 229 will turn 60° about its axis 215, and the velocity of the latter will smoothly increase and then smoothly decrease. The velocity of the driven member 229 is represented by a curve 232 plotted against angular position of the driver member 228 in FIG. 28, it being assumed that the driver member 228 turns 120° with constant speed.

The intermittent or Geneva mechanism therefore constitutes a device which, when the carrier 210 is stationary, acts to accelerate the driven member 229 and then to decelerate it in the opposite direction of rotation (counterclockwise) from that direction of rotation (clockwise, FIG. 20) which the output member normally turns. To produce this acceleration-deceleration cycle, it is only necessary that the driver element 228 be rotated 120° in the same direction (clockwise, FIG. 20) as that in which the carrier 210 turns. Assuming the carrier 210 to be stationary, the velocity of the driven member 229 in a counterclockwise direction will have values indicated in FIG. 28 as the driver rotates 120°, and the driver member will rotate a total of 60° during this interval. Thus, the driven element 229 rotates $m$ degrees about its axis 215 while the driver element 228 rotates $n$ degrees about its own axis 220, the values of $m$ and $n$ in the present case being 60° and 120°, respectively.

However, if the driver member 228 is held stationary so that it cannot rotate about its own axis 220, it becomes locked to the driven member 229. Bodily rotation of the driver member 228 with the carrier 210 about the first axis 215 thus turns the driven member 229 in unison.

In order normally to hold the driver member 228 against rotation about its own axis 220, but to affirmatively drive it through one cycle or 120° in response to an actuating signal, a limited rotation clutch-brake combination is employed. As here shown (FIGS. 5, 18, and 19), a clutch-brake element 234 is splined to but axially movable along the shaft 219, and formed with axially extending tapered projections or teeth 235 on its right end. It has similar axially extending inclined teeth 236 on its left end. A shifting yoke 238 fulcrumed at 239 (FIG. 19) has one end engaged in a circumferential groove 243 of the element 234 and its other end connected with the collar 226. Thus, the spring 224 normally biases the collar 226 to the left, and holds the element 234 shifted to the right so that the brake is normally engaged, i.e., the teeth 235 engage in mating depressions 240 formed in the carrier flange 218. When the element 234 is shifted to the right, as viewed in FIGS. 18 and 19, therefore, it is positively held against rotation about the axis 220, and so prevents rotation of the shaft 219 and driver element 228 about the axis 220.

To affirmatively rotate the driver member 228 selectively through one cycle (here, 120°) about its own axis 220 and in the same direction as the carrier 210 is rotating about its axis 215, a stationary sun gear 241 is mounted adjacent the carrier 210 and meshed with a planet gear 242 which is journaled with freedom normally to rotate relative to the shaft 219. However, the planet gear is formed with an integral, axially extending portion which projects through the flange 216 and which has axial depressions 244 in the face thereof adapted to receive the clutch teeth 236 on the element 234 when the latter is shifted to the left (FIG. 19). That is, when the element 234 is shifted to the left, the normally engaged brake (formed by teeth 235 and depressions 240) is disengaged, and the normally disengaged clutch (formed by teeth 236 and depressions 244) is engaged. Under these conditions, the planet gear 242 is drivingly connected to the shaft 219 and the latter is positively driven about its axis 220 in the same direction as the rotation of the carrier 210. Thus, whenever the rod 185 is shifted to the right (FIGS. 18 and 19) the element 234 will be shifted to the left so that its braking teeth 235 are disengaged and its clutching teeth 236 are engaged in depressions 244 to form a positive drive connection between the planet gear 242 and the driver member 228. In summary, it will be seen that the element 234 acts as a selector element which locks the driver element 228 to the carrier when shifted axially to the right (FIG. 19), and which drivingly connects the driver element to the planet gear 242 when shifted axially to the left, so that the driver element is driven for rotation about the axis 220.

In accordance with one feature of the present slowdown unit, the driver element 228 is turned about its own axis during each cycle of operation only sufficiently to make the Geneva mechanism produce one cycle of acceleration and deceleration, and the driven member 229 is rotated, as a result of the Geneva action, in a direction opposite to that of the carriage so that the Geneva rotation is subtracted from the ordinary rotation produced by the carrier. If the driver member 228 had four rollers spaced at 90° and the driven member had four slots spaced at 90°, this would require 90° of rotation of the driver. In the present instance, however, since the driver member 228 has three rollers 230 and the driven member has six slots 231, 120° of rotation of the driver is required to produce one cycle of Geneva motion. Such a predetermined amount of rotation of the driver member 228 may be effected by the timed displacement and return of the rod 185 by means of the lever 182. However, as here shown, the clutch and the brake teeth 235, 236, together with the biasing spring 224, form a limited rotation, self-return brake and clutch unit similar in its action to the familiar "one revolution" clutch except for the fact that it restores after only one-third of a revolution. This permits the rod 185 to be shifted to the right only momentarily to initiate a cycle of operation, and the mechanism automatically resets after one cycle.

To produce this action, the shiftable element 234 is sized in axial length such that one set of its teeth 235 or 236 always engages one or the other of the two sets of depressions 240 and 244. As shown in the developed view of FIG. 22, the teeth 235 on the right end of the element 234 are spaced at 120° intervals as are the mating depressions 240 in the carrier flange 218. These depressions 240 are separated by lands 245. Thus, when the element 234 is shifted to the left (as viewed in FIG. 19) and engages that planet gear depressions 244, that element can be biased back toward the right after only a slight amount of planet gear rotation occurs. The teeth 235 on the right end of the element 234 will then slide along the land surfaces 245 until they snap back into the depressions 240, this action simultaneously disengaging the clutch teeth 236 from the planet gear 242. Thus, the rod 185 need only be shifted momentarily to the right to initiate a cycle of operation, and the driver element 228 will automatically be relocked against rotation about its own axis 220 after it is turned 120°.

In accordance with an important feature of the present slowdown units, the rotation and velocity produced by the action of the Geneva mechanism is subtracted from the rotation and velocity of the carrier 210. To appreciate how the present mechanism accomplishes this, assume that under normal operating conditions the Geneva mechanism is locked, i.e., one of the rollers 230 is at the entrance of a slot 231 in the driver member 229 as shown in FIG. 23. A second one of the rollers 230 (not shown in FIG. 23) will be disposed at the mouth of a second one of the slots 231, so that bodily clockwise movement of the carrier 210, the shaft 219, and the driver element 228 will drive the output member 229 in unison.

As a cycle of operation commences by shifting of the element 234 into driving engagement with the planet gear 242, the driver member 228 begins also to turn clockwise about its own axis 220. This makes the roller 230 move radially inward of the slot 231 from the position shown in FIG. 23 to that shown in FIG. 24. When rotation of the carrier 210 or bodily movement of the shaft 219 has amounted to 30° (from the position shown in FIG. 23 to that of FIG. 24), the driver member and the roller 230 will have rotated 30° about the axis 220, inasmuch as the sun gear 241 and the planet gear 242 are formed with the same diameter. If the carrier 210 were stationary, this would mean that the driven member 229 would be turning counterclockwise about the axis 215 at amout 40 percent of the velocity of the planet gear 242 (see FIG. 28). But because the carrier 210 is rotating at 100 percent of the velocity of the planet gear 242, the net speed of the driven member 229 is the difference between the speed of the carrier 210 and the speed which the driven member would have if it were being rotated only as the result of the Geneva action. Thus, with the parts having the positions shown in FIG. 24, the planet gear 242 having rotated 30°, the driven member 229 will be rotating in a clockwise direction but at a speed which is only about 60 percent of the speed of the carrier 210. The variation in speed of the driven member 229 is represented by a curve 248 in FIG. 29, such curve being plotted as a percentage of normal speed versus the angle of rotation of the planet gear 242 or the driver member 228 about the second axis 220. It will be seen from the curve 248 that when the driver member 228 has rotated 30° about its own axis, the speed of the driven member 229 is only about 60 percent of the speed of the carrier 210.

The driven member 229, as shown in FIG. 24, has rotated only about 25° about the axis 220 from the position illustrated in FIG. 23, due to the fact that the Geneva action produces a loss of motion. Thus, as the carrier 210 rotates 30°, the output or driven member 229 rotates only about 25°.

By the time that the carrier 210 has rotated 60° about the axis 215 (from the position shown in FIG. 23 to that illustrated in FIG. 25), the planet gear 242 and the driver member 228 have also rotated 60° about the axis 220. The roller 230 has, therefore, reached its point of maximum entry into the slot 231. The Geneva output speed is now a maximum, i.e., 100 percent of the planet gear speed, as shown by the graph 232 in FIG. 28. However, because this Geneva output speed is subtracted from the carrier velocity of 100 percent, the output or driven member 229 is at this instant stationary, i.e., has zero velocity, as shown by the curve 248 in FIG. 29. And, by the time that the components reach the position shown in FIG. 25, the driven member 229 is turned only 30° about the axis 215, although the planet carrier 210 has rotated 60° about the axis 220.

As the components reach the position shown in FIG. 26, the roller 230 has begun to retreat out of the slot 231. The carrier has rotated 90° about its axis 215, the driver member 228 and the planet gear 242 have rotated 90° about their axis 220, and the output member has rotated approximately 35° about the axis 219. The velocity of the output member 229 is now smoothly increasing because the velocity produced by the Geneva mechanism per se is decreasing. See FIGS. 28 and 29.

Figure 27:
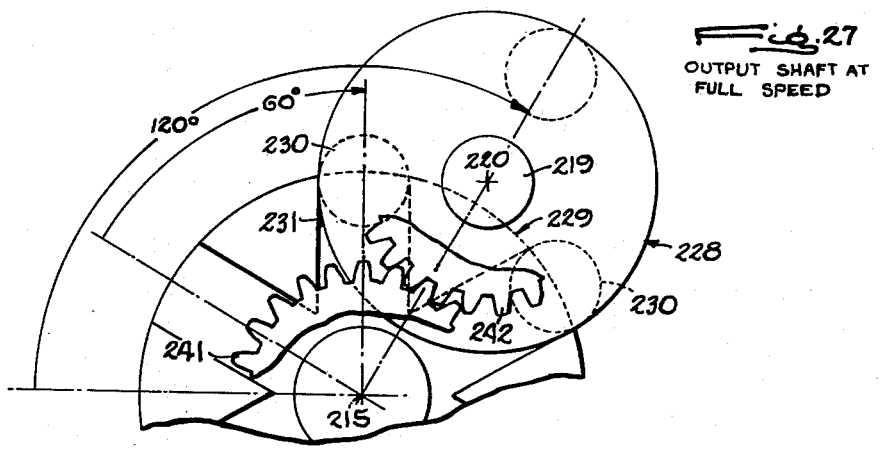

By the time the components reach the position shown in FIG. 27, the carrier 210 and the driver member 228 have both rotated 120° about their respective axes 219 and 220. The roller 230 is returned to the mouth of the slot 231 which it entered and the driven member 229 is now relocked to the carrier 210. The velocity of the output member 229 is now the same as that of the carrier 210.

From the foregoing description and from FIGS. 28 and 29, it may be noted that the carrier 210 rotates continuously at a speed which may be designated $W_1$. The Geneva mechanism or means for accelerating-decelerating the driven member 229 includes means for accelerating the member 229 from a zero velocity up to a maximum of $W_2$ in velocity, and then decelerating it again to zero velocity in a counterclockwise direction. This would occur if the carriage 210 were stationary. But with the carriage rotating clockwise at a velocity $W_1$, the net result is that the driven member decelerates from a velocity $W_1$ to a velocity of zero and then accelerates back to a velocity $W_1$, while its net rotation is always in a clockwise direction. By choice of the relative diameters of the Geneva mechanism components and the sun and planet gears, the velocities $W_1$ and $W_2$ are made equal, so that at the midpoint of the cycle the net velocity of the driven element 229 becomes $W_1-W_2=0$. This means that the transmission input shafts 65, 66 (FIG. 5) will be substantially stationary at the instant the clutches are shifted, and the bolts 94 (FIG. 6) transfer without clash or damage.

Because of the Geneva subtraction, the output member 229 is rotated only 60° from its original position shown in FIG. 23 during this cycle of Geneva operation. But considering the curve of velocity variation in FIG. 29, it will be apparent that the driven member 229 has been smoothly decelerated from its original speed to a substantially zero speed, and then smoothly accelerated back to its original velocity. This action occurs during 120° rotation of the carrier 210. Thus, in a general sense, it may be observed that when the intermittent or Geneva mechanism acts through one cycle, the driver member rotates $n$ degrees about its own axis 220 while the carrier 210 rotates $p$ degrees in the same direction about its axis 215. The Geneva action tends to rotate the driven member $m$ degrees in the opposite direction, so that due to the subtraction, the output member or element 229 actually rotates $p-m$ degrees about the axis 215 in the same direction as the carrier. In the present instance, therefore, the output member loses $m=60°$ of rotation during each cycle of the slowdown unit. By the same token, the output member actually rotates $p-m=120°-60°=60°$ during the interval that it is being decelerated and accelerated.

Recalling that the gears 211–214 (FIG. 5) in the present instance have a 6:1 reduction ratio, one cycle of the slowdown unit, i.e., 120° rotation of the carrier 210, occurs during two revolutions of the main shaft 69. During this time, the output or driven member 229 is rotated clockwise through only 60°. But in the present example, the gears 71, 72 and 73 which form a drive connection from the driven member 229 to the transmission input shafts 56 and 61 produce a 3:1 step up in speed, the gears 72, 73 having a diameter which is one third that of the gear 71. Thus, the input shafts 65, 66 will turn 180° while the slowing down and speeding up action illustrated in FIG. 29 occurs. This means that under normal conditions the transmission input shafts 65 and 66 are driven one half revolution for each revolution of the main shaft 69. But each time that the slowdown unit 70 is put through one cycle of operation, the main shaft 69 turns two revolutions while the input shafts 65, 66 turn only one half revolution. Thus, the main shaft 69 gains a predetermined angle of 360° relative to the normal corresponding rotation of the input shafts 65, 66, which is normally caused by the main shaft. Stated another way, the input shafts 65, 66 lose a predetermined angle, i.e., one half revolution, relative to the rotation which would otherwise be caused by the main power shaft 69, as a result of the slowdown unit being put through one cycle of operation.

Restating the foregoing in general terms, during ordinary driving conditions when the slowdown unit is not being cycled, the main shaft 69 rotates $r$ degrees while the input shafts 65, 66 rotate $s$ degrees, where the ratio $s/r$ is 1/2 in the present case. When the slowdown unit 70 is cycled, the main shaft rotates $t$ degrees (720°) while the input shafts 65, 66 rotate $u$ degrees (180°), the carrier 210 rotates $p$ degrees (120°), the driver member 228 rotates $n$ degrees (120°), and the driven member 229 rotates $m$ degrees (60°). Now, the cam 170 is so phased on the main shaft 69 that after the follower 168 is engaged therewith, the lever 182 is rocked and the clutch element 234 shifted to the left (FIG. 5) to start a cycle of the Geneva operation when the input shafts 65, 66 are still displaced by an angle of $u/2$ degrees (90°) from one of the two positions (180° apart) at which the holes in members 100 and flanges 101 are alined. By the time that the Geneva cycle is halfway completed, so that the velocity of the input shafts 65, 66 is substantially zero (FIG. 29), the shafts 65, 66 will have rotated $u/2$ degrees (90°) and the bolts 94 (FIG. 6) will be alined for transfer between the holes in the members 100 and 101. At this instant the main shaft will have rotated $t/2$ degrees (360°) from the position it occupied when the Geneva mechanism was actuated. The cam 121 is so shaped and phased on the main shaft that its follower 122 (previously dropped into engagement) will shift the frame 120 to the left substantially at this instant, i.e., after the main shaft 69 has rotated $t/2$ degrees, the carrier 210 has rotated $p/2$ degrees, the driven member has rotated $m/2$ degrees, and the input shafts 65, 66 have rotated $u/2$ degrees—following the instant at which the Geneva cycle was started. This means that the clutch bolts 94 (FIG. 6) are transferred from one position to another at an instant when (a) the input shafts 65, 66 have substantially zero velocity, and (b) the clutch elements or bolts are in one of two predetermined angular positions (spaced 180° apart) at which they are alined with the holes in the mating parts 97, 100. The transfer of the positive clutch elements is thus smoothly and reliably accomplished despite the fact that the main shaft 69 continues to rotate at its original speed.

To summarize the combined operation of the slowdown unit and the shift actuating mechanism, it may be assumed that the main shaft 69 and the cams 170, 121 are continuously rotating at, say, 600 r.p.m. The gears 211–214 (FIG. 5) thus drive the carrier 210 at 100 r.p.m. The slowdown unit will normally drive the gear 71 at 100 r.p.m., and the gears 72, 73 will thus drive the transmission input shafts 65, 66 at 300 r.p.m. In other words, the input shafts 65, 66 normally turn one half revolution for each revolution of the main shaft 69.

To reset the Z axis transmission 61 to a different drive ratio, appropriate ones of solenoids SZ1, SZ2, SZ4, SZ8, SZ16, and SZr, are first energized to determine the new Z axis transmission ratio according to Table III, supra. Then the solenoid CS will be momentarily energized (by means to be discussed below) as the cam 170 reaches a predetermined angular position. The cam follower 168 thus drops into the cam 170 and first shifts the link 180 and the lever 182 to the left, thereby moving the rod 185 (FIG. 19) to the right, shifting the clutch element 234 to the left. The planet gear 242 begins to drive the driver member 228 about the axis 220. The cam follower 168 is then moved to the right by the cam 170, causing the rod 194 to release the latch 196 and drop the cam follower 122 into the cam 121. Just after this, the radial cam 190 lifts and relatches the cam follower 168, and the link 180 is released by the collar 186 clearing the retaining pin 168 (FIG. 16). The clutch element 234 is now free to snap back to the right (FIG. 19) under the influence of the spring 224 as soon as the shaft 219 and the driver member 228 have turned 120° about the axis 220. But shortly after the follower 122 drops into the cam 121, the shifting frame 120 is moved to the left. The cam 121 is so shaped that this movement of the frame 121 occurs just when the driver member 228 has turned 60° about the axis 220 so that the velocity of the driven member 229, the gear 71 and the input shafts 65, 66 are at that instant all substantially zero (see FIG. 29). Moreover, by virtue of the fact that the main shaft 69 is rigid with the cam 121 and the track of the latter shifts the frame 120 to the left when the shaft 69 has a particular angular position at the instant that the Geneva cycle is half completed, this movement of the frame 120 occurs substantially when the shafts 65 and 66 are at one of two angular positions (180° apart) in which the clutch bolts 94 (FIG. 6) are alined with the apertures of the flanges 101 and the stationary portions 100. The clutches thus transfer without clash.

As the main shaft 69 continues to rotate, the transmission input shafts 65, 66 are accelerated (see FIG. 29). The follower 122 displaces the frame 120 to the right of its original position and all the shifting pins 127 previously released by energization of the selected solenoids are cocked and relatched in their second positions. Then the radial cam 206 lifts the follower 122 and the latch 196 holds it up. After the clutch element 234 has rotated 120°, it snaps back automatically into locking engagement with the carrier 210, so that the latter now directly drives the input shafts 65, 66.

The transmission 61 is thus now set to the desired ratio. Of course, the X axis transmission will at the same time be reset to a new drive ratio, depending upon the combination of its solenoids which were energized prior to the beginning of the shifting cycle. The shifting has been accomplished while the main shaft 69 continues to rotate, although the transmission input shafts 65, 66 have been slowed down, the clutches shifted, and the input shafts then speeded up. During the shifting cycle, the main shaft 69 turned two revolutions, but the transmission input shafts turned only one half revolution. Thus, there has been a loss of one half revolution of the transmission input shafts, relative to their normal drive from the main shaft 69, because of the action of the slowdown unit 70.

For a purpose to be described, a limit switch LS (FIG. 5) is associated with the lever 201. Its normally open contacts LS$a$ and normally closed contacts LS$b$ are actuated, i.e., respectively closed and opened, whenever the lever 201 pivots to drop the cam follower 122 into engagement with the cam 121.

CONTROLLED TRANSPORT OF THE ELONGATED RECORD

The elongated record or punched tape 75 (FIGS. 2 and 4) is given a pre-established distance or number of rows between two successive sets of indicia which represent not only the beginnings of two successive increments of motion but also the transmission ratios which are to be in effect during those two successive increments of motion. Moreover, the elongated record or punched tape 75 is transported or advanced at a predetermined rate or in timed relation to the rotation of the main shaft 69, i.e., inches per revolution or numbers of lines per revolution, relative to the main shaft 69. As shown in FIG. 2, an input pulley 78$a$ for the tape reader 76 is driven by the nonslip belt 78 from the main shaft 69, the reader having means to advance the tape one row for each revolution of the main shaft. Thus, when the slowdown unit 70 is in its normal condition and positively driving the input shafts 66, 65, the tape 75 is transported in timed relation to those input shafts, i.e., one row for each half revolution of the input shafts.

The tape reader 76 may take a variety of forms available commercially, and a schematic illustration of one suitable form is shown in FIG. 30. The reader 76 includes means for producing signals corresponding to each set of indicia on the punched tape 75, and, more specifically, a separate set of signals for each transverse row of punched holes as that row passes by a predetermined point. As here shown, the tape 75 is advanced lengthwise and in steps over the tips of a plurality of sensing elements or spring feeler pins F1 through F8 which are respectively alined with columns one through eight. This feed motion is produced by an intermittent drive mechanism 260 having an input shaft 261 driven from the belt and pulley 78, 78a, and an output shaft 262 carrying a sprocket 264 having teeth engaged with the lengthwise row of sprocket holes formed in the tape itself. The sprocket 264 is intermittently stepped by the mechanism 260 as the pulley 78a rotates continuously, the sprocket being stepped to advance the tape 75 one row past the tips of the feeler pins F1–F8 for each revolution of the main shaft 69. Thus, successive ones of the transverse rows of the holes spaced lengthwise along the tape 75 are brought into alinement with the feeler pins F1–F8 and held momentarily stationary in that alined position.

A cam 265 underlies the pins F1–F8 and is continuously driven from the pulley 78a. This cam has a radial projection 266 thereon which urges all of the pins upwardly toward the tape 75 at each instant when the latter is stationary with a row of holes overlying the pin tips. Those pins which find a hole in the corresponding column will pass through such holes and thus be elevated; and those pins which find no hole will be blocked against upward movement by engagement with the tape itself.

In order to convert the combination of holes sensed in any row of the tape 75 into corresponding electrical signals, a plurality of multi-contact switches TR1 through TR8 are mechanically connected to respective ones of feeler pins F1 through F8. Those switches will be actuated when the corresponding pin is elevated as a result of finding a hole in the tape 75. Thus, the combination of the switches TR1 through TR8 which are simultaneously actuated corresponds to the combination of holes present in the particular transverse row of tape which is being read. To make certain that the combination of actuated switches is sensed at the proper instant, a timing switch TS having normally open contacts TSa, TSb, TSc is disposed adjacent a second cam 268 having a sharp radial lobe 269. The timing switch contacts are thus closed by the cam 268 for a short instant during each interval that the cam 265 is urging all of the pin F1–F8 upwardly. Summarized, as each row of indicia on the punched tape 75 passes through the tape reader 76, a corresponding set of signals is produced by actuation of the switches TR1–TR8 in different combinations.

The manner in which the reading of the successive rows of holes on the punched tape by actuation of the switches TR1–TR8 is caused to produce different control functions will be described below. For the present it will suffice to note simply that the punched tape 75 is stepped longitudinally one row for each revolution of the main shaft 69, and the switches TR1–TR8 are thus momentarily closed according to the combination of holes which exist in the particular row then alined with feeler pins F1–F8. By the present description of the schematically illustrated tape reader in FIG. 30, it is not intended to indicate that the punched tape 75 cannot be continuously advanced or that other suitable reading means, such as photosensitive elements, cannot be employed. The illustration in FIG. 30 is exemplary only.

The transport and reading of the punched tape 75 in coordination with the rotation of the main shaft 69 is of importance in the programmed motion control system which is being described. This makes it possible for the length of the tape between two successive sets of indicia to determine precisely the length of an increment of motion of the carriage 50 and cross slide 49 along the Z and X axes.

For example, suppose that the Z axis transmission 61 is shifted to a drive ratio of .030 inch per half revolution of the input shaft 66 in response to one set of indicia on the tape 75 and that the latter has a total of forty-one lines before the next set of indicia thereon. Since the main shaft 69 will turn one revolution for each of the forty-one rows as the tape 75 is advanced, the input shaft 66 for the Z axis transmission will rotate a total of forty half revolutions, one half revolution thereof being lost as a result of the action of slowdown unit 70 when the transmission was shifted to the desired ratio. Therefore, as the tape 75 is advanced lengthwise through forty-one rows thereon, the input shaft 66 will turn forty half revolutions, and at a ratio of .030 inch per half revolution, the carriage 50 will be translated a total of 1.200 inches before the transmission is shifted to neutral or changed to another ratio.

As noted above, whenever the slowdown unit 70 is put through one cycle and the clutches of the Z axis transmission 61 are shifted, one half revolution of the transmission input shaft 66 is lost, i.e., the shaft 69 turns one revolution and the tape 75 is advanced one row without any corresponding movement of the input shaft 66. Therefore, the length of tape between two successive sets of indicia is made one row longer than would otherwise be required to produce the desired length for an incremental movement. While in the foregoing example the punched tape 75 would normally be transported forty transverse rows as the input shaft 66 rotates forty half revolutions and the movable element or carriage 50 is translated 1.200 inches, a total of forty-one rows is provided on the tape to produce the 1.200 inches of travel with the axis transmission set to its .030 inch ratio. The extra row of tape is consumed by the operation of shifting the transmission clutches to the desired ratio.

In the foregoing discussion, reference has been made to specific, exemplary gear and drive ratios. That is, it has been indicated that during normal drive through the slowdown unit 70, the transmission input shaft 66 turns one half revolution for each revolution of the main shaft 69; that during one cycle of the slowdown unit 70, the input shaft 66 loses one half revolution; and that the tape reader 76 and the tape reading means therein are driven such that the punched tape 75 is advanced one transverse row for each revolution of the main shaft 69. Of course, these specific values or ratios can be varied considerably as a matter of design choice, and it will be helpful here to present generalized expressions of the relationships which are to be provided. For this purpose, the following symbols may be employed and identified as follows:

$L$ = the length of movement of the carriage 50 for one increment, expressed in inches.

$R$ = the selected ratio to which the transmission 61 is set during that increment of movement, expressed in inches of travel of the carriage per revolution of the input shaft 66.

$k$ = the factor of proportionality between the speed of the main shaft 69 and the speed of the input shaft 66 during normal drive through the slowdown unit 70.

$m$ = the rate at which the elongated record 75 is advanced through the reader 76, expressed in inches of tape per revolution of the main shaft 69.

$\alpha$ = the angle, expressed as a multiple or fraction of revolution, which the input shaft 66 loses during one cycle of the slowdown unit 70.

$d=$ the distance which the elongated record is transported while the main shaft 69 is, in effect, directly driving the input shaft 66.

$c=$ the distance the elongated record is transported while the main shaft 69 is, in effect, disconnected from the input shaft 66 due to the loss of motion occasioned by a cycle of the slowdown unit 70.

$D=$ the total distance on the elongated record between two successive sets of indicia necessary to produce an increment movement having a length L.

With the foregoing symbols so identified, it will be apparent that the input shaft 66 must make $L/R$ revolutions in order to translate the carriage an increment length L. Secondly, to shift the transmission 61 to the ratio R at the beginning of the increment, the input shaft 66 will lose $\alpha$ revolutions of rotation while the main shaft 69 continues to rotate. Thus, the main shaft 69 will have to rotate $kL/R$ revolutions to translate the carriage 50 an incremental length L, and $k\alpha$ revolutions to effect the slowdown and shifting operation. Thus, the total number of revolutions of the main shaft 69 will have to be $k(L/R+\alpha)$.

But if the main shaft rotates $k(L/R+\alpha)$ revolutions, the tape 75 will be transported $mk(L/R+\alpha)$ inches. Therefore, $D=mk(L/R+\alpha)$ inches. This is the distance between two successive sets of indicia on the punched tape 75, the first set representing the ratio R for the increment of movement in question, and the second set causing not only termination of that increment but shifting of the transmission to the desired ratio for the succeeding increment. The distance D is equal to $c+d$, where $c=mk\alpha$ and $d=mkL/R$.

It may be assumed for purposes of discussion that there are ten rows of holes on the tape 75 for each inch of length thereof, i.e., that each row occupies one-tenth of an inch. With this assumption, the foregoing expression for the distance D may be applied to the specific ratios employed in the exemplary apparatus as described above. Thus, in the present instance the value of $k$ is 2, since the main shaft 69 rotates two revolutions for each revolution of the input shaft 66 under normal conditions; the value of $m$ is 0.10 inch, since the tape 75 is advanced one row of holes for each revolution of the main shaft 69; the value of $\alpha$ is one half revolution since that is the angle which the input shaft 66 loses during one cycle of the slowdown unit 70.

Applying these values to the expression $$D=mk(L/R+\alpha)$$

we obtain:

$$D+.10\times2(L/R+1/2)$$

Now if it is desired to move the carriage 50 the total of 1.200 inches, that will be the value of L. If it is desired to effect this motion with the transmission 61 set to its ratio of .030 inch per half revolution of the input shaft 66, the ratio R will be twice that value, i.e., .060 inch per revolution of the shaft 66. Applying these values we obtain:

$$D=0.2(1.200/.060+1/2)=4.1 \text{ inches.}$$

Since, as assumed above, each row of the tape 75 occupies one-tenth of an inch of length of that tape, it is known that the total number of rows between the two successive sets of indicia of the punched tape must be 41. Thus, the distance D of the punched tape is the sum of two distances, i.e., a distance $d$ which is directly proportional to the ratio $L/R$ plus a distance $c$ which is the distance that the punched tape 75 moves during the "lost" motion of the input shaft 66 occasioned by one cycle of the slowdown unit 70. In the present example, therefore, the distance $d$ is four inches or forty rows on the tape 75, and the distance $c$ is 0.10 inch or one row on the tape.

Thus, to produce increment of movement having a length L with the transmission set to a ratio R, the number of rows between two successive sets of indicia on the punched tape must be $2\times L/R$ plus one extra row to accommodate a cycle of the slowdown unit 70. The distance $c$ will be the same for all increments of motion, whereas the distance $d$ will determine the length of each increment and will vary according to both the desired length L of the increment and the drive ratio to which the transmission is set for that increment.

While the foregoing discussion has been directed to the input drive of the Z axis transmission 61 and the resulting motion of the carriage 50 along the Z axis, it will be apparent that the same considerations apply equally well to the X axis transmission 56 and the motions of the cross slide 49.

Referring to FIG. 4, that portion of the punched tape 75 which is included in the distance labeled D is intended to produce the #1 increment (see FIG. 3B of −1.230 inches along the X axis. It is desired then that the rate of movement be .030 inch per half revolution of the input shaft 65. Thus, the first row of holes included within the distance D represents Z0, and constitutes an extra line or distance $c$ forming a part of the total distance D. That first row of holes representing Z0 will result in the Z axis transmission 61 being shifted to its zero ratio, so that the carriage 50 will remain stationary. The second row of holes included in the distance D represents −X.030, i.e., the desired ratio, and will set the transmission 56 to drive the cross slide 49 at a rate of .030 inch per half revolution of the input shaft 56. In between the first line (representing Z0) included in the distance D and the next row following the distance D, there are a total of forty-one rows on the tape. Some of these rows may be entirely blank and some may contain auxiliary information represented by punched holes. The distance D is thus equal to a total of forty-two lines, wherein the distance $c$ is one line and the distance $d$ is forty-one lines. Since the distance $c$ or the first line, in effect, produces no motion of either the input shaft 56 or the cross slide 49, it may be disregarded. Thus, it will be apparent that the length L which the carriage 50 is moved is $41\times.030=1.230$ inches. The total distance D between two successive sets of indicia (i.e., between the two successive Z codes) is thus equal to forty-one lines plus an extra line for shifting purposes, i.e., the total of forty-two lines or 4.2 inches.

This relationship between the distances D or number of rows on the tape 75 between two successive sets of indicia and the length of movement will be made clearer as the following operational description occurs with reference to the exemplary control circuits.

At this point it will be appropriate to treat an important advantage which accrues from the system here described. The number of axes or transmissions being controlled in the present instance is two. And, by choice of the particular gear ratios associated with the main shaft 69 and slowdown unit 70, the distance $c$ which the tape advances for each increment with no corresponding movement of the controlled member is made equal to the distance necessary to receive the ratio indicia for one less than the number of transmissions being controlled, i.e., one row on the tape. If three axes were being controlled, then the distance $c$, by choice of gear ratios in the slowdown unit 70, would be made equal to two rows of the punched tape 75. This would enable three ratio codes to be read from the tape 75 to energize selected solenoids in three transmissions just prior to the actuation of shifting mechanism. The fact that there is an "extra" line or lines for each increment on the punched tape 75 is, therefore, an important advantage because it lets all of a plurality of transmissions receive ratio-determining signals while one complete cycle of the slowdown unit and shifting mechanism occurs, yet preserves a desired relationship between the extent of motion produced under normal driving conditions for each unit distance or row on the tape.

CONTROL CIRCUITS AND OPERATION

The specific control circuits illustrated in FIG. 31 are exemplary, and may of course take a variety of equivalent forms. It is believed that the organization and operation of the control circuits and their cooperation with the apparatus previously described may best be described by a narration of sequential events which occur in response to reading of different codes or rows of holes appearing on a punched tape, such as that shown in FIG. 4, which by the indicia thereon represents a desired program of motion.

In FIG. 31 the various contacts which are controlled by the different switches (TR1–TR8 in FIG. 30, for example) mentioned above will be identified by the same reference characters employed to identify the switch, but with a distinguishing alphabetical suffix for each set of switch contacts. Moreover, the various control relays will be identified by individual reference characters such as R9, R10, etc., while the contacts controlled by such relays will be identified with the same reference character to which a distinguishing suffix is added, e.g., R9a, R9b, R10a, etc. Those contacts which are normally closed when the switch or relay is deactuated are shown as completing a conduction path, while normally open contacts are shown in that condition.

Assume now that a punched tape 75 such as that illustrated in FIG. 4 has been threaded into the reader 76 (FIG. 30) and that the two transmissions 56 and 61 have their clutches all deactuated or set to produce a zero drive ratio. To start the spindle motor 63 and the feed motor 68, an operator momentarily presses the start switch ST (FIG. 31), thereby connecting the coil of a motor contactor MC across D.C. voltage supply lines L1 and L2. The contactor MC is sealed in and its coil held energized by current flow through its own contacts MCa, and a normally closed stop switch SP. Energization of the coil MC results in the closure of its contacts MCb and MCc, thereby connecting a power source to the spindle motor controller 64 to start the spindle motor 63. Similarly the contacts MCd aind MCe close to connect the feed motor controller 74 to a power source to start the feed motor 68. The motor controllers 64 and 74 may be manually or automatically adjusted to select different speeds of operation of the motors 63 and 68, but since that is not a feature necessary to the understanding of the present invention, it will not be detailed here.

With both the motors 63 and 68 energized, the tape 75 (FIGS. 4 and 30) will be advanced through the reader 76 by drive from the main shaft 69 (FIG. 2). The various transverse rows of holes thereon will be read successively. Rows representing Z and X codes in succession are herein termed "sets of indicia" and other rows in the present illustration are simply blank, i.e. have no perforations in columns 1–8.

Means are provided for deriving from successive sets of indicia on the punched tape 75 successive sets of electrical signals, together with means responsive to those signals for setting the Z and X axis transmissions to the directions (+ or −) and drive ratios represented by such indicia. This is termed the Z and X axis decoding, and is performed by the decoders 80, 79 (FIG. 2) as well as the slowdown unit 70, the electrical portions of which are illustrated in FIG. 31.

At the beginning of each section of the punched tape 75 which corresponds to one increment of motion, there will be two successive rows which by the combination of holes therein represent Z and X codes. Each line will represent either a plus or a minus direction (depending upon the absence or presence of a hole in column 6), and some desired ratio between zero and .031 inch per half revolution of the transmission input shafts 66 and 65.

Assume that two successive rows on the tape 75 represent −Z.015 and +X.003. When the first row representing −Z.015 (see Tables I and II, supra) is read, the holes therein will result in simultaneous actuation of the tape reader switches TR7, TR6 and TR1–4. While those switches are actuated, the timing switch contacts TSa (FIGS. 30 and 31) will momentarily close, thus completing the energization path from the line L1 through contacts TSa, TR8, TR7a and LSb, for the coil of a relay R9. The contacts R9a close to energize the cycle solenoid CS (FIGS. 15 and 31), thereby initiating one cycle of the cams 170, 121 and of the slowdown unit 70, as previously described. Moreover, the relay contacts R9b will close while the contacts TSa and TR7a are still closed. This will momentarily energize the solenoids SZ1, SZ2, SZ4, SZ8 and SZr through the already closed tape reader contacts TR1a, TR2a, TR3a, TR4a and TR6a. Accordingly, the corresponding ones of the pins 127 (FIG. 6) in the Z axis transmission will be released to positions such that they will shift the clutches therein to the necessary positions for producing a drive ratio of .015 inch, and in a −Z direction.

When the cam follower 122 is unlatched in response to energization of the solenoid CS and drops into the cam 121 (FIG. 5), but before the shifting frame 120 is reciprocated, the limit switch LS is actuated, thereby opening contacts LSb and closing contacts LSa (FIG. 31). Relay R9 is thus dropped out and prevented from being re-energized so long as contacts LSb remain open. Relay R10 is, however, now conditioned to be energized through contacts LSa when the next succeeding row, representing +X.003, is read from the tape 75.

The main shaft 69 has now started its second revolution and the tape reader 76 senses the second row of holes in the tape. This is a +X.003 code according to the example given above. Accordingly, the reader switches TR1 and TR2 will be actuated and the timing contacts TSa will close. The latter will energize relay R10 and its contacts R10a will close to complete a current flow path through contacts TR16 and TR2b to energize solenoids SX1 and SX2. This releases the corresponding pins 127 in the X axis transmission.

Then the cam 121 and its follower 122 (FIG. 5) will shift the frame 120 to the left and then to the right, and the released pins 127 will shift the appropriate ones of the corresponding clutches to set the Z and X axis transmissions respectively to −.015 and +.003 drive ratios, as previously described. The cam follower 122 is then lifted and relatched so that contacts LSa and LSb are deactuated. The carriage 50 and cross slide 49 (FIG. 2) are now being translated in −Z and +X directions at feed rates equal to .015 and .003 inches per half revolution of the input shafts 66 and 65. The tape 75 is being advanced past and read by the feeler pins F18 in the reader 76 (FIG. 30) one row for each revolution of the main shaft 69 and thus one row for each .015 and .003 inch of travel of the carriage 50 and cross slide 49, respectively.

When the next set of indicia, i.e., successive Z and X code rows, of the punch tape 75 are read, the decoding and shifting operation described above will be repeated. According to the particular signs and values represented by any set of Z and X code rows, the X and Z axis transmissions 61 and 56 may be individually set to any ratio between 0 and .031 inch (in steps of .001 inch), and to drive their corresponding movable elements (carriage 50 and the cross slide 49) in either positive or negative directions. With the decoding system here disclosed, a set of indicia always includes both Z and X code rows, the corresponding transmission being set to a zero ratio if no motion (represented by a Z0 or X0 code) along the Z or X axis is desired. Each time that a shifting cycle occurs, the transmission input shafts 65, 66 are automatically slowed down by a cycle of the slowdown unit 70, and they also lose a predetermined angle (in the illustrated example, one half revolution), relative to their normal rotation which would otherwise be caused by the main shaft 69, so that a predetermined small length c (here one transverse row) of the tape 75 passes through the reader without corresponding motion of the movable members.

With this understanding of the manner in which the punched tape is read to produce signals which operate the controls of FIG. 31, it will be appropriate to narrate the operations which will occur sequentially in response to the reading of the various rows of coded indicia appearing on the exemplary punched tape 75 in FIG. 4, and which will produce the incremental motions shown in FIGS. 3A and 3B.

After the spindle and feed motors 63 and 68 have been started, and the tape 75 (FIG. 4) is being transported through the reader 76 (FIG. 30) the first two significant rows of holes appearing on the punched tape 75 in FIG. 4 represent the directions and drive ratios described for the first increment of motion which is depicted in FIG. 3B. Since this increment of motion is to be 1.230 inches in a negative direction along the X axis, the Z and X code lines are made to represent Z0 and −X.030, respectively. As these two rows of holes are read, therefore, the slowdown unit 70 and shifting mechanism will be put through one cycle, the Z axis transmission 61 will be left in its zero drive ratio, but the X axis transmission 56 will be set to its .030 ratio and for drive of the cross slide 49 in a negative direction.

It will be seen from FIG. 4 that this increment of motion amounting to 1.230 inches is produced by a distance D on the tape containing a total of forty-two lines. The first line or distance $c$ representing the Z0 code is not, however, counted as contributing to motion of the cross slide 49 since, as previously noted, the operation of the slowdown unit 70 in shifting of the transmissions results in loss of one-half revolution of the transmission input shafts and thus the loss of one row of tape. Accordingly, the distance $d$ for the #1 increment illustrated on the tape in FIG. 4 is made 41 lines although the total distance $D=c+d$ is forty-two lines. At a drive ratio of .030 inch per half revolution of the transmission input shaft, this will cause the cross slide to move a total of 1.230 inches before the transmissions are again shifted to begin the #2 increment.

As noted in FIG. 3B, however, it is intended that the cutter tool move inwardly toward the workpiece a total of 1.244 inches. Thus, after the first increment of motion is completed, a "remainder" of .014 inch remains to be traveled. This remainder is produced by the two rows, i.e., the #2 increment row and the extra row preceding it, on the tape 75 (FIG. 4).

As the Z and X code lines for the #2 increment are read, the main power shaft 69 will rotate two revolutions. However, the Z axis transmission will be shifted to its zero drive ratio and the X axis ratio will be shifted to its −.014 drive ratio. During the slowdown and shifting operation, the X axis input shaft will be rotated through one-half revolution, so that the cross slide will be translated precisely .014 inch. Thus, the cutter has now traveled through increments #1 and #2, shown in FIG. 3B.

The next series of rows appearing on punch tape 75 begin with the representations of +Z.030 and X0. In response to reading of those Z and X code rows, the two transmissions are shifted so that the Z transmission is set to its .030 ratio and the X axis transmission is set to its zero ratio. Thus, the carriage 50 and the cutter 46 begin moving toward the left, as shown in FIG. 3B, to produce the #3 increment of motion.

Because the #3 increment is to have a length of .960 inch (FIG. 3B), the rows or sprocket holes assigned to that increment on the tape 75 (FIG. 4) include the initial Z code row which is disregarded due to loss upon cycling of the slowdown unit 70, and thirty-two additional rows counting the X0 row. Since the Z axis transmission is set to a .030 ratio, the cutter will be moved a distance of .030×32=.960 inch before the succeeding Z and X code indicia are sensed by the tape reader.

Following that group of rows on the punched tape 75 corresponding to the #3 increment of motion are two Z and X code lines which represent the #4 increment of motion. It will be seen that when these two rows of holes are read, the Z axis transmission will be set to its +.020 ratio and the X axis transmission will be set to its zero ratio. Since there are but two lines on the tape representing this #4 increment, the distance $D=c+d$, where $c$ is one row and $d$ is one row. As these two rows are read, the input shaft for the Z axis transmission will rotate only one-half revolution while that transmission is set to its .021 ratio. Accordingly, the cutter 46 will be advanced .021 inch during the #4 increment, making the total distance between points $b$ and $c$ in FIG. 3A equal to the desired .981 inch.

The next series of rows on the punched tape of FIG. 4 correspond to the #5 increment illustrated in FIG. 5. It will be seen that the first two code rows represent +X.030 and +X.015. As these rows are read, the Z and X transmissions will be set to their +.030 and +.015 drive ratios, so that the cutter 46 will be advanced at an angle (see FIG. 3A) due to simultaneous controlled motion of the carriage 50 and the cross slide 49. The #5 increment of movement is completed and terminated after all of those rows of holes indicated therefor in FIG. 4 have been read. It will be seen that in addition to the first Z code row which is not counted, there are thirty-four rows of holes on the tape for this increment. Thus the cutter 46 will be translated .030×34=1.020 inches along the Z axis and .015×34=.510 inch along the X axis. This is the desired motion illustrated in FIG. 3B.

Finally, after the #5 increment of motion has been completed, the last two rows of punched holes on the tape 75 are read. These represent the codes Z0, X0. When the Z0 and X0 codes are read, the two transmissions are both shifted to their zero drive ratios so that both the carriage 50 and the cross slide 49 are brought to a stop.

From the foregoing summary of operation, it will be apparent that the system described is one in which both the directions and lengths of successive increments of motion of a movable member may be controlled directly in response to coded indicia which are represented on an elongated record or punched tape. The motion-transmitting apparatus contributes in large measure to capabilities of the system as a whole, since the selective clutch shifting mechanism responds to electric selection signals and properly sets a plurality of positive clutches to any desired combination or pattern of positions with but a single reciprocatory motion of a shifting frame. The rotational input to those transmission clutches are slowed down for the very short interval required to effect the actual shifting, so that clutch clash or damage is avoided. And by virtue of the fact that each cycle of the slowdown unit causes a predetermined angle of rotation to be lost, the total rotation of the transmission output shafts (and thus the total translation of the carriage 50 and slide 49) is always known in terms of the total rotation of the main power shaft, the latter being accounted for in advance by the punched tape, since the latter is driven in timed relation from the main shaft. Not only then is it possible with the present apparatus to selectively set positive clutch transmissions to different desired successive drive ratios, but it is possible to do so quickly in response to electrical selection signals while accurately determining or metering the total rotation or travel of the output members.

I claim as my invention:

1. In combination, a multi-ratio transmission having input and output shafts and a plurality of two-position positive clutch elements selectively shiftable to different position patterns to establish different drive ratios between said input and output shafts, a main shaft adapted to be continuously rotated, a slowdown unit drivingly interposed between said main shaft and said input shaft, said unit including means for normally establishing a direct drive between said main shaft and said input shaft, cyclically operable means connected between said main shaft and said input shaft for causing said input shaft to decelerate and then accelerate while said main shaft continues to rotate, said cyclically operable means including means for causing said input shaft to rotate a predetermined, fixed angle less than it would otherwise be driven in response to each deceleration-acceleration cycle, and means responsive to an actuating signal for initiating one cycle of said cyclically operable means, means operative during such cycle for shifting said clutch elements to a desired position pattern substantially at the instant when said input shaft has been decelerated to its lowest velocity, whereby the total rotation of said output shaft is known or determinable in terms of the total elapsed rotation of said main shaft, the number of shifting cycles which have occurred, and the number of revolutions of said main shaft while the transmission is operating at each of a succession of drive ratios.

2. In combination, a multi-ratio transmission having input and output shafts and a plurality of clutch elements selectively shiftable to different position patterns to establish different drive ratios between said input and output shafts, a main shaft adapted to be continuously rotated, a slowdown unit drivingly interposed between said main shaft and said input shaft, said unit including an intermittent drive mechanism and means for normally locking the same to establish a direct drive connection between said main shaft and input shaft, means for releasing said locking mechanism, means responsive to such release for causing said intermittent mechanism to operate through one cycle, means operative during a cycle of said intermittent mechanism to decelerate and then accelerate said input shaft while said main shaft continues to rotate at its original velocity, said last-named means including means for causing said input shaft to rotate a predetermined angle less than it would otherwise be driven from said main shaft as an incident to each cycle of said intermittent mechanism, and means for shifting selected ones of said clutch elements substantially at the instant that said input shaft has its lowest velocity during the cycle of said intermittent mechanism.

3. In combination, a multi-ratio transmission having input and output shafts and a plurality of two-position positive clutch elements selectively shiftable to different position patterns to establish different drive ratios, said clutch elements being shiftable from one position to another only when said input shaft is in one of a number of predetermined angular positions, a main shaft adapted to be continuously rotated, a slowdown unit drivingly interposed between said main shaft and said input shaft, said unit including means for normally establishing a positive drive between said main shaft and said input shaft, said unit further including an intermittent drive mechanism having (a) cyclically operable means to interrupt said positive drive, (b) cyclically operable means to decelerate and then accelerate said input shaft while the latter rotates $u$ degrees and the main shaft rotates $t$ degrees at its original speed, means responsive to an actuating signal to initiate one cycle of said intermittent mechanism at an instant when said input shaft has approached to within $u/2$ degrees from one of said predetermined angular positions, and means for shifting selected ones of said clutch elements substantially at the time when said main shaft has rotated $t/2$ degrees following the instant that said cycle is initiated, whereby said clutch elements are shifted without clash or damage at an instant when said input shaft is in one of said predetermined angular positions and when said input shaft is at its lowest angular velocity.

4. In combination, a multi-ratio transmission having input and output shafts and a plurality of two position positive clutch elements selectively shiftable to different position patterns to establish different drive ratios, said clutch elements being transferable from one position to another only when said input shaft is in one of a number of predetermined angular positions, a main shaft adapted to be continuously rotated, a slowdown unit drivingly interposed between said main shaft and said input shaft, said unit including a Geneva mechanism and means for normally locking the same to establish a direct drive between said main shaft and said input shaft, said unit further including means for releasing said locking means, and means responsive to such release for driving said Geneva mechanism through one cycle of operation to decelerate and accelerate said input shaft as the latter is driven through $u$ degrees and the main shaft continues to rotate at its original speed through an angle of $t$ degrees, means for actuating said releasing and driving means at an instant when said input shaft has approached to within $u/2$ degrees from one of said predetermined angular positions, and means responsive to rotation of said main shaft through $t/2$ degrees following said instant for shifting selected ones of said clutch elements to their opposite positions so as to change the drive ratio of said transmission.

5. In combination, a multi-ratio transmission having input and output shafts and a plurality of positive clutches selectively shiftable to establish different ones of a plurality of drive ratios between such shafts, a main shaft adapted to be continuously rotated, a slowdown unit drivingly interposed between said main shaft and said input shaft, said unit including means for normally establishing a positive drive connection between said main shaft and said input shaft, said last-named means including (a) cyclically operable means for interrupting said positive drive connection and (b) cyclically operable means for reducing the speed of said input shaft to zero and then restoring it to its original value while said main shaft continues to rotate, preselection means responsive to sets of electric signals for mechanically representing the positions of respective ones of said clutches to establish a transmission ratio corresponding to those sets of signals, and means responsive to the reception of an actuation signal for (a) actuating said cyclically operable means in said slowdown unit, and (b) then shifting said clutches to the positions represented by said preselection means substantially at the instant that the speed of said input shaft is zero.

6. In combination, a multi-ratio transmission having input and output shafts and a plurality of positive clutches selectively shiftable to establish different ones of a plurality of drive ratios between such shafts, a main shaft adapted to be continuously rotated, a slowdown unit drivingly interposed between said main shaft and said input shaft, said unit including a carrier driven from said main shaft, and rotatable about a first axis, a Geneva mechanism including a drive member journaled on said carrier for rotation about a second axis radially displaced from said first axis, a driven member engaged with said driver member and journaled for rotation about said first axis, means drivingly connecting said driven member to said input shaft, means for normally locking said driver member against rotation about said second axis so that said carrier and driven member turn in unison, means for selectively releasing said locking means, means for rotating said driver member about said second axis in the same direction as said carrier turns while said locking means are released, means for reengaging said locking means after one cycle of operation of said Geneva mechanism, so that said input shaft decelerates and then accelerates while said main shaft continues to rotate at its original speed, a plurality of members each corresponding to one of said clutches and movable to first or second positions to represent a desired pattern of actuated clutches, means responsive to electric selection signals for moving desired combinations of said members to their first positions, means responsive to an actuating signal for initiating operation of said releasing and rotating means, and means for shifting said clutches to the position pattern represented by the positions of said members substantially at the instant that said input shaft is decelerated to its lowest velocity by said Geneva mechanism.

7. In a system for driving an output shaft at different speed ratios from a continuously rotating main shaft, the combination comprising a multi-ratio transmission having a plurality of two-position positive clutches shiftable to different position patterns to establish different drive ratios between an input shaft and an output shaft, a main power shaft adapted to be driven with continuous rotation, a selectively and cyclically operable slowdown unit drivingly interposed between said main shaft and said input shaft, said slowdown unit having (a) means normally establishing a positive drive connection between said main and input shafts, (b) cyclically operable means for interrupting said positive drive connection, and (c) cyclically operable means for decelerating and then accelerating said input shaft relative to said main shaft as the latter continues to rotate, a shifting frame reciprocatable between first and second positions, a plurality of members each corresponding to one of said clutches and all carried by said frame and movable between first and second positions relative thereto, means for selectively moving different combinations of said members to their second positions, means for restoring all of said members to their first positions as an incident to said frame returning from its first to its second position, means responsive to movement of said frame to its second position for shifting those clutches corresponding to said members in their second positions to one position and for shifting those clutches corresponding to said members in their first positions to the opposite position, and means responsive to a shift signal for (a) actuating said two cyclically operable means and (b) then moving said frame to its second position while said input shaft is reduced in velocity and then restoring said frame to its first position.

8. In a system for driving an output shaft at different speed ratios from a continuously rotating main shaft, the combination comprising a multi-ratio transmission having a plurality of two-position positive clutches shiftable to different position patterns to establish different drive ratios between an input shaft and an output shaft, a main power shaft adapted to be driven with continuous rotation, a selectively and cyclically operable slowdown unit drivingly interposed between said main shaft and said input shaft, said slowdown unit including (a) a carrier rotationally driven from said main shaft about a first axis, (b) a Geneva mechanism having a driver member and a driven member, (c) means journaling said driver member on said carriage for rotation about a second axis radially displaced from said first axis (d) means journaling said driven member for rotation about said first axis and locating the same in engagement with said driver member, (e) means for normally locking said driver member against rotation about said second axis, (f) means for selectively releasing said locking means, and (g) means operative during such release for driving said driver member about said second axis in the same direction as said carrier turns to produce one cycle of Geneva operation and to thereby decelerate and accelerate said driven member, means connecting said driven member to drive said input shaft, a shifting frame reciprocatable between first and second positions, a plurality of selector members each corresponding to one of said clutches and all carried by said frame and movable between first and second positions relative thereto, means for selectively moving different combinations of said selector members to their second positions, means for restoring all of said selector members to their first positions as an incident to said frame returning from its first to its second position, means responsive to movement of said frame to its second position for shifting those clutches corresponding to said selector members in their second positions to one position and for shifting those clutches corresponding to said selector members in their first positions to the opposite position, means responsive to a shift signal for actuating said releasing and driving means, and means for moving said frame to its second position while said input shaft is reduced in velocity, and then restoring said frame to its first position.

9. The combination comprising an element shiftable between first and second positions, a shifting frame movable between first and second positions, a pin carried by said frame and movable relative thereto between first and second positions, means biasing said pin toward one of its positions, means for latching said pin in the other of said positions as an incident to its being moved thereto, electrical means for releasing said latching means in response to a signal supplied thereto, stationary means disposed adjacent said frame and forming a one-way connection for shifting said pin to its second position as an incident to movement of said frame to its first position, means forming a one-way connection between said pin and said element when the pin is in its first and second positions, respectively, for causing said element to be shifted to its second and first positions respectively as an incident to movement of said frame to its second position, and means for reciprocating said frame first to its second position and then to its first position, whereby said element is (1) shifted to or left in its second position or (2) shifted to or left in its first position depending upon whether or not said electrical means receives a signal prior to the reciprocation of the frame.

10. The combination comprising a plurality of elements shiftable between first and second positions, a frame movable between first and second positions, a plurality of members each corresponding to one of said elements carried by said frame and movable between first and second positions relative to the frame, means biasing said members toward their first positions, a plurality of rockers respectively corresponding to said members pivoted to said frame and movable between first and second positions relative thereto, stationary means having one-way engagement with all of said rockers to shift the latter to their first positions as an incident to movement of said frame to its first position, latch means for holding respective ones of said rockers in their second positions, means responsive to electrical signals for releasing respective ones of said latch means, means connecting said rockers with respective ones of said members so that the former shift the latter to their second positions when the rockers are moved to and latched in their second positions, means forming one-way connections between each said member and its corresponding element to shift the latter to its first or second position when the former is respectively in its second or first position as an incident to movement of said frame from its first to its second position, and means for reciprocating said frame from its first to its second position and back again, whereby said elements are shifted to a pattern of positions in which those elements corresponding to signal responsive means energized before reciprocation of the frame are placed in their second positions and the remaining elements are placed in their first positions.

11. The combination comprising a plurality of clutch elements each rotationally rigid with but axially shiftable between first and second positions relative to a supporting shaft, a plurality of yokes each connected with one of said clutch elements and movable between first and second positions to correspondingly shift said clutch elements, a frame reciprocable between first and second positions, a plurality of members carried by said frame for bodily movement therewith and movable between first and second positions thereon, means for latching each of said members in its second position, means for biasing each of said members toward its first position, means for releasing a selected combination of said latching means so that said biasing means move a selected combination of said members to their first positions, means for reciprocating said frame from its first to its second position and back again, means responsive to one cycle of reciprocation of said frame for causing those ones of said members in their first positions to shift the corresponding ones of said yokes to their first positions and for causing those ones of said members in their second positions to shift the corresponding ones of said yokes to their second positions, and means for restoring all of said members to their second positions in response to the return of said frame to its first position.

12. The combination comprising a plurality of clutch elements axially shiftable between first and second positions relative thereto, a plurality of shifter yokes each engaged with one of said clutch elements and movable between first and second positions to correspondingly shift said clutch elements, a frame shiftable back and forth between first and second positions, a plurality of fingers carried by said frame adjacent respective ones of said yokes and movable between first and second positions within said frame, means for biasing each of said pins to its first position, means for latching each of said pins in its second position in response to movement of the pin to such second position, means establishing a one-way connection between each pin and its corresponding yoke to shift the latter to its first position in response to reciprocation of said frame between its first and second positions whenever such pin is in its first position, means establishing a one-way connection between each pin and its corresponding yoke to shift the latter to its second position in response to reciprocation of said frame between its first and second positions whenever such pin is in its second position, signal responsive means for releasing selected combinations of said latching means, means for reciprocating said frame from its first position and to its second position and back again, and means for shifting all of said pins to their second positions upon the return stroke of said frame to its first position.

13. In a multispeed transmission, the combination comprising an input shaft adapted to be rotationally driven, an output shaft, a plurality of planetary gear sets connected in tandem and each having an input element selectively driven or held stationary to provide either of two drive ratios for that set, a plurality of clutch elements axially shiftable between first and second positions, means associated with each of said clutch elements for holding the input element of the corresponding gear set stationary or locking it to said input shaft when that clutch element is respectively in its first or second positions, a frame reciprocatable from a first to a second position and back again, a plurality of pins carried on said frame and movable between first and second positions relative thereto, a plurality of yieldable means for biasing respective ones of said pins toward their first positions, a plurality of latches associated with respective ones of said pins for releasably holding the latter in their second positions when shifted thereto, a plurality of solenoids having armatures connected to respective ones of said latches for releasing the latter in response to electric energization, means for shifting all of said pins to their second positions in response to said frame returning to its first position after a cycle of reciprocation, means forming one-way connections between each of said pins and its corresponding clutch element to shift the latter to its first or second position when the former is respectively in its second or first position as an incident to movement of said frame from its first to its second position, and means for imparting one cycle of reciprocation to said frame following energization of a selected combination of said solenoids, whereby those clutch elements which correspond to previously energized solenoids will be shifted to or left in their second positions and those clutch elements corresponding to solenoids previously not energized will be shifted to or left in their first positions, the overall drive ratio between said input and output shafts thus being determined by the particular combination of solenoids previously energized.

14. A mechanism adapted to be interposed between a continuously rotating input shaft and an output shaft, and operative normally to drive the output shaft but selectively actuatable to decelerate and accelerate the latter, said mechanism comprising, in combination, a carrier journaled for rotation about a first axis and adapted to be driven from the input shaft in a first direction, an output member journaled for rotation about said first axis and adapted to drive the output shaft, means normally connecting said carrier to said output member so that the two rotate in unison in said first direction, said last-named means including a Geneva mechanism having a driven element connected to said output member, a driver element journaled on said carrier for rotation relative thereto about a second axis, and a normally engaged brake for preventing rotation of said driver element about said second axis, means for selectively releasing said brake, and means responsive to release of said brake for driving said driver element about said second axis in said first direction of rotation so that said Geneva mechanism rotationally accelerates and then decelerates said output member in a second, opposite direction relative to the carrier, and means for re-engaging said brake after one cycle of such acceleration and deceleration, whereby the angular displacement and velocity of said output member produced in response to release of said brake subtract from the displacement and velocity produced by said connecting means, and the output member decelerates and accelerates relative to its normal speed.

15. The combination set forth in claim 14, and further characterized in that said carrier is normally driven at a speed $W_1$ in said first direction, and said Geneva mechanism includes means for accelerating said output member in said opposite direction from an initial velocity of zero to a maximum velocity of $W_2$ and then decelerating the same to zero velocity again relative to said carrier, the velocities $W_1$ and $W_2$ being substantially equal so that said output member is decelerated from an absolute velocity $W_1$ in said first direction to zero velocity and then accelerated again to the velocity $W_1$.

16. The combination set forth in claim 14 further characterized in that said Geneva mechanism includes means for rotating said output member $m$ degrees in said opposite direction during each cycle of acceleration and deceleration, so that for each cycle of operation said output member loses $m$ degrees of rotation in said first direction relative to said carrier.

17. The combination comprising a carrier adapted to be rotationally driven about a first axis, a Geneva mechanism including a driver element and a driven element, means journaling said driver element on said carrier for bodily movement therewith and for rotation relative thereto about a second axis radially spaced from and parallel to said first axis, means journaling said driven element for rotation about said first axis and locating said driven element to have operative engagement with said driver element, means for normally locking said driver element to said carrier to prevent relative rotation thereof, means for selectively releasing said locking means, means responsive to such release for rotationally driving said driver element about said second axis in the same rotational direction as the movement of said carrier about said first axis, and means for disabling said driving means and re-engaging said locking means after said Geneva mechanism has executed one cycle of operation.

18. The combination comprising a carrier adapted to be continuously rotated in one direction, a Geneva mechanism having a driver element and a driven element, means journaling said driver element for bodily movement with said carrier and for rotation relative thereto about a second axis radially spaced from and parallel to said first axis, means journaling said driven element for rotation about said first axis and locating the driven element in engagement with said driver element, a planet gear bodily carried by said carrier and journaled for rotation about said second axis, a stationary sun gear concentric with said first axis and meshed with said planet gear, a selector element rotationally rigid with said driver element and shiftable between first and second positions, means operative when said selector element is in its first position for locking said driver element against rotation about said second axis so that said carrier and driver element turn in unison about said first axis, and means operative when said selector element is in its second position for drivingly connecting said planet gear and said driver element so that the former drives the latter about said second axis.

19. The combination set forth in claim 18 further characterized by means for biasing said selector element normally to its first position, selectively actuatable means for shifting said selector element to its second position, and means for restoring said selector element to its first position after said Geneva mechanism has executed one cycle of operation.

20. The combination set forth in claim 18 further characterized by yieldable means normally biasing said selector element to its first position, a cam rotatably driven in synchronism with said carrier, a follower normally retracted from said cam, means responsive to a signal for engaging said follower with said cam, said cam having means to displace and return said follower during one revolution of said cam when the follower is engaged with the cam, a linkage connected between said follower and said selector element and constituting means for shifting said selector element to its second position when the follower is displaced, and means for retracting said follower from said cam after the latter has rotated through a predetermined angle.

21. A device having a continuously rotating input and a selectively slowed output comprising, in combination, an input carrier adapted to be continuously driven in one direction of rotation about a first axis, a Geneva mechanism having inter-engaged driver and driven elements, means journaling said driver element on said carrier for bodily movement therewith but rotation relative thereto about a second axis parallel to but radially displaced from said first axis, means journaling said driven element for rotation about said first axis, a stationary sun gear, a planet gear carried by said carrier and journaled for rotation about said second axis and meshing with said sun gear, a brake normally locking said driver element to said carrier, means including a normally disengaged clutch for drivingly connecting said planet gear and driver element, means for releasing said brake and engaging said clutch, and means responsive to one cycle of Geneva motion for disengaging said clutch and engaging said brake.

22. A device having a continuously rotating input and a selectively decelerated and accelerated output comprising, in combination, an input carrier adapted to be continuously driven for rotation about its own axis, an intermittent mechanism having a driver element and a driven element, means journaling said driver element on said carrier for bodily movement therewith and for rotation relative to the carrier about a second axis parallel to but radially displaced from said first axis, means journaling said driven element for rotation about said first axis and locating the same in cooperating engagement with said driver element, said driver and driven elements having means to rotate the latter $m$ degrees about said first axis in response to $n$ degrees of rotation of said driver element about said second axis, selectively disengageable first means for normally locking said driver element to said carrier, selectively engageable second means for causing rotation of said driver element about said second axis in the same direction that said carrier is turning, means for disengaging said first means and engaging said second means, and means responsive to rotation of said driver element through $n$ degrees for disengaging said second means and re-engaging said first means.

References Cited by the Examiner
UNITED STATES PATENTS

| 2,841,370 | 7/58 | Cosmetto | 74—436 X |
| 2,885,899 | 5/59 | Foster | 74—339 X |

DON A. WAITE, *Primary Examiner.*